United States Patent
Barenboim et al.

[11] Patent Number: 5,940,304
[45] Date of Patent: *Aug. 17, 1999

[54] CONTROLLING A LASER TEXTURING TOOL HAVING TWO HANDLING STATIONS FOR DISKS TO BE TEXTURED AND A SINGLE TEXTURING STATION

[75] Inventors: Michael Barenboim, Boca Raton, Fla.; Peter Michael Baumgart, San Jose, Calif.; Peter P. Chrusch, Boynton Beach, Fla.; Benjamin Karni, San Jose, Calif.; Pieter J. M. Kerstens; Hong S. Seing, both of Boca Raton, Fla.; Andrew Ching Tam, Saratoga, Calif.

[73] Assignee: International Business Machines Corporation, Armonk, N.Y.

[*] Notice: This patent is subject to a terminal disclaimer.

[21] Appl. No.: 08/707,384
[22] Filed: Sep. 4, 1996
[51] Int. Cl.[6] .............................. G06F 17/00; G06G 7/48
[52] U.S. Cl. ................................. 364/478.08; 364/478.04; 364/474.03; 364/470.05; 364/474.05; 219/121.77; 219/121.68; 219/121.82
[58] Field of Search .................. 364/478.04, 478.08, 364/474.035, 470.05, 468.26, 176, 167.1, 213; 360/135; 425/176.4; 428/579, 694, 900; 219/121.66–83; 427/53.1, 128, 130, 131, 132, 48

[56] References Cited

U.S. PATENT DOCUMENTS

| | | | |
|---|---|---|---|
| 5,108,781 | 4/1992 | Ranjan et al. | 427/53.1 |
| 5,459,297 | 10/1995 | Boppel et al. | 219/121.25 |
| 5,520,981 | 5/1996 | Yang et al. | 428/65.5 |
| 5,539,213 | 7/1996 | Meeks et al. | 250/559.23 |
| 5,550,696 | 8/1996 | Nguyen | 360/135 |
| 5,586,040 | 12/1996 | Baumnart et al. | 364/474.08 |
| 5,602,021 | 2/1997 | Ranjan et al. | 360/135 |
| 5,635,269 | 6/1997 | Weir et al. | 428/65.3 |
| 5,658,475 | 8/1997 | Barenboim et al. | 219/121.77 |
| 5,699,160 | 12/1997 | Barenboim et al. | 356/359 |
| 5,759,419 | 6/1998 | Mochida et al. | 216/22 |

OTHER PUBLICATIONS

*Instruction Manual for Model 7300 Laser Systems,* Spectra Physics, Mountain View, CA.

*Primary Examiner*—Reba I. Elmore
*Assistant Examiner*—Ramesh Patel
*Attorney, Agent, or Firm*—Richard A. Tomlin; Ronald V. Davidge

[57] ABSTRACT

A disk texturing tool is used, for example, to provide textured spots in an annular portion of both sides of a hardfile disk. Disks are moved into and out of the texturing process in cassettes, through two disk-handling stations. Control of the tool is achieved using a right-side disk handling and processing controller, a right-side cassette handling controller, a left-side disk handling and processing controller, and a left side cassette handling controller. The two disk handling and processing controllers share hardware resources performing the texturing process.

14 Claims, 9 Drawing Sheets

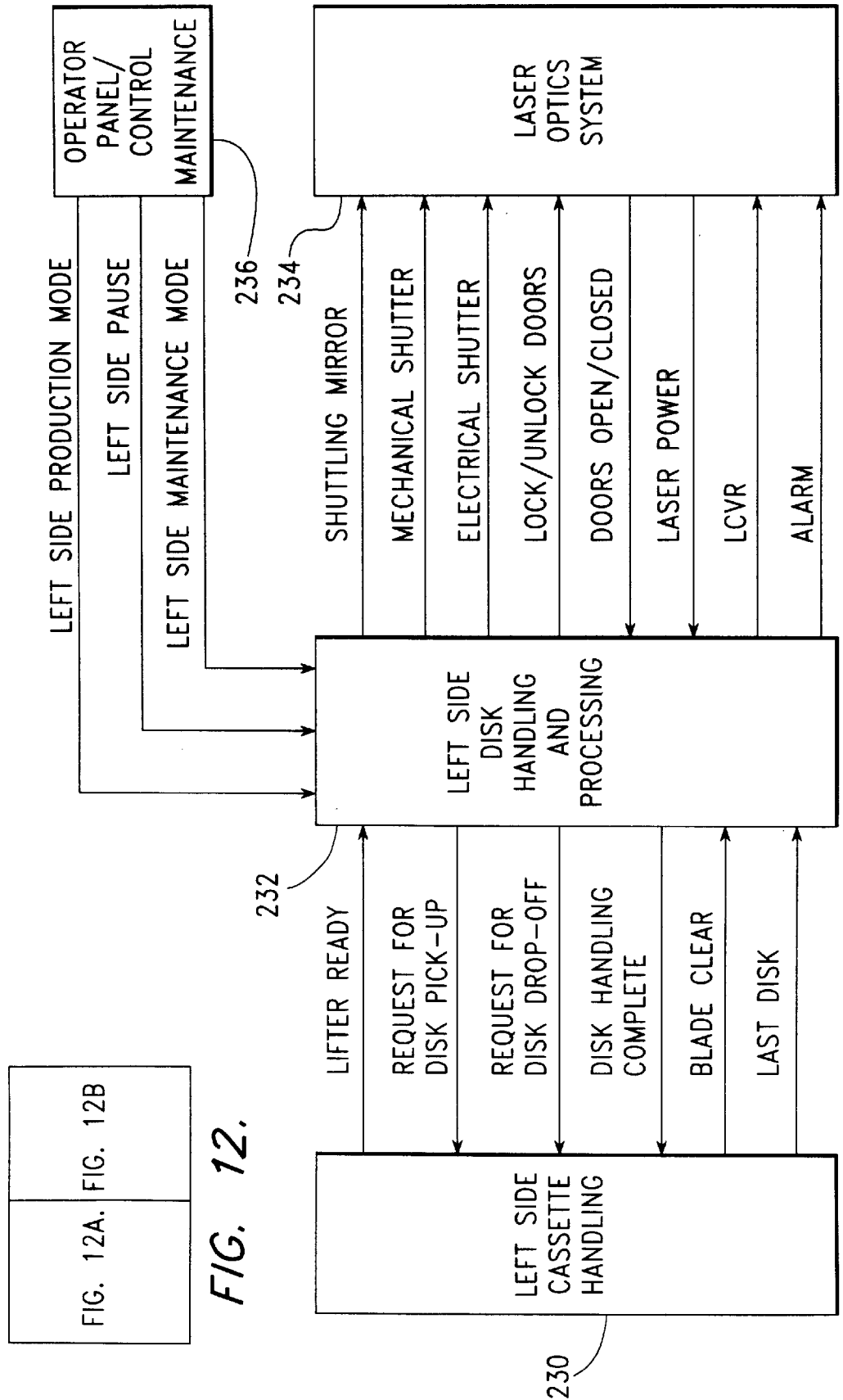

CONTROLLING A LASER TEXTURING TOOL HAVING TWO HANDLING STATIONS FOR DISKS TO BE TEXTURED AND A SINGLE TEXTURING STATION

CROSS-REFERENCE TO RELATED APPLICATIONS

A co-pending U.S. application, Ser. No. 08/150,525, filed Nov. 10, 1993, entitled "Procedure Employing a Diode-Pumped Laser for Controllably Texturing a Disk Surface," by Peter M. Baumgart, et al., having a common assignee with the present invention, the disclosure of which is hereby incorporated by reference, describes a process for creating a "distant bump array" surface texture in a magnetic recording disk for reducing stiction, together with the disk so textured. The texturing process uses a tightly focused diode-pumped Nd:YLF or Nd:YVO$_4$ or other solid-state laser that is pulsed with a 0.3–90 nanosecond pulse train to produce a plurality of distantly-spaced bumps in the disk surface. The bump creation process is highly controllable, permitting repeated creation of a preselected bump profile, such as a smooth dimple or one with a central protrusion useful for low stiction without close spacing or elevated "roughness." Some bump profiles permit texturing of the data-storage region of the disk surface for low stiction without materially affecting magnetic data storage density. The application, Ser. No. 08/150,525 has been abandoned and continued as Ser. No. 601,887 on Feb. 15, 1996, which issued on Jun. 16, 1998 as U.S. Pat. No. 5,768,076, with a divisional application, Ser. No. 457,559 being filed from the original application on Jun. 1, 1995, and with a continuation, Ser. No. 889,348, of the divisional application being filed on Jul. 8, 1997.

Another co-pending U.S. application, Ser. No. 08/613,564, filed Mar. 11, 1996, which has subsequently issued as U.S. Pat. No. 5,658,475, entitled "Apparatus for Laser Texturing Disks," by Michael Barenboim, et al, having a common assignee with the present invention, further describes a laser texturing station in which the electronic control apparatus of the present invention may be used.

Another co-pending U.S. application, filed on an even day herewith, Ser. No. 08/707,383, entitled "Optical Apparatus for Dual-Beam Laser Texturing," having a common assignee with the present invention describes optical apparatus for splitting and controlling a texturing laser beam used with the electronic control apparatus of the present invention;

Another co-pending U.S. application, filed on an even day herewith, Ser. No. 08/707,383, entitled "Controlling Pulses in a Laser Texturing Tool," and having a common assignee with the present invention, describes a method for controlling the laser used with the electronic control apparatus of the present invention.

Another co-pending U.S. application, filed on an even day herewith, Ser. No. 08/707,385, now U.S. Pat. No. 5,830,514, entitled "Method for Controlling Laser Power in a Texturing Process," and having a common assignee with the present invention, describes a program for setting and maintaining the laser power levels in the optical apparatus used with the electronic control apparatus of the present invention.

BACKGROUND OF THE INVENTION

1. Field of the Invention

This invention relates to apparatus for fabricating a disk, such as a magnetic recording disk used in a computer hard disk having surfaces textured by exposure to a pulsed laser, and, more particularly, to means for controlling independent left and right materials handling sub-systems, together with a single texture processing sub-system, within such apparatus.

2. Background Information

Current hard disk drives use a Contact Start-Stop (CSS) system allowing a magnetic head, used to read and write data, to contact the surface of a magnetic disk in a specific CSS region when the disk is stationary. Thus, before the rotation of a spinning disk has stopped, the magnetic head is moved to the CSS region, where the magnetic head settles on the surface of the disk. When the disk again starts to rotate, the magnetic head slides along the disk surface in this region, until the laminar air flow at the disk surface, due to its rotation, fully lifts the magnetic head from the disk surface.

After the magnetic head is lifted in this way, it is moved from the CSS region to another region of the disk to read and write data. The CSS region is preferably textured to minimize physical contact between the magnetic head and the disk surface. In this way, the contact stick-slip phenomenon often called "stiction" and other frictional effects are minimized, along with the resulting wear of the magnetic head surface. Outside the CSS region the remainder of the disk surface preferably retains a specular smoothness to permit high-density magnetic data recording.

In the area of sub-system control, the conventional methods for controlling multiple sub-systems employ either a central control processor and software to control all sub-systems, or a master supervisory control software, running in a master supervisory control processor, to control other software and processor sub-systems.

DESCRIPTION OF THE PRIOR ART

U.S. Pat. No. 5,062,021, to Ranjan et al., describes a process in which magnetic recording media are controllably textured, particularly over areas designated for contact with data transducing heads. In conjunction with rigid disk media, the process includes polishing an aluminum nickel-phosphorous substrate to a specular finish, then rotating the disk while directing pulsed laser energy over a limited portion of the radius, thus forming an annular head contact band while leaving the remainder of the surface specular. The band is formed of multiple individual laser spots, each with a center depression surrounded by a substantially circular raised rim. The depth of the depressions and the height of the rims are controlled primarily by laser power and firing pulse duration. The shape of individual laser spots can be altered by varying the laser beam inclination relative to the disk surface. On a larger scale, the frequency of firing the laser, in combination with disk rotational speed controls the pattern or arrangement of laser spots. The smooth, rounded contours of the depressions and surrounding rims, as compared to the acicular character of mechanical textured surfaces, is a primary factor contributing to substantially increased durability of laser textured media.

BRIEF DESCRIPTION OF THE DRAWINGS

FIG. 11 is a block diagram of software running in the processors of one side of the tool of FIG. 4.

DETAILED DESCRIPTION

Figure 1:
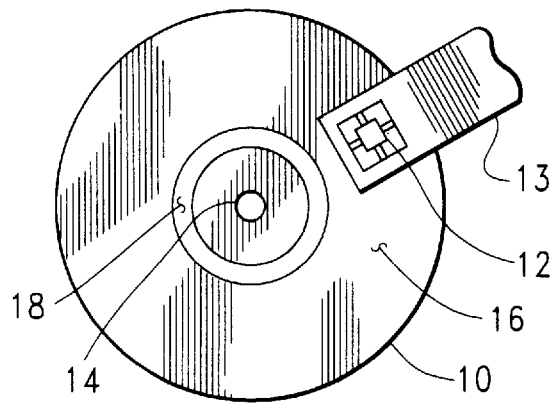
FIG. 1 is a plan view of an internal portion of a prior-art disk drive unit, including a rotatable magnetic disk having a textured annular region for CSS operation, and a magnetic head.

FIG. 1 is a plan view of a portion of a disk drive unit from the prior art for a computing system, including a rotatable magnetic storage disk 10, together with a magnetic head 12, which is driven in a generally radial direction relative to the disk 10 by means of a drive arm 13. This disk 10 is an example of the type of product which can be made using the apparatus of the present invention. When the disk drive unit is in operation, disk 10 is rotated about its central hole 14, forming a laminar flow of air holding magnetic head 12 slightly away from the adjacent disk surface 16. Before this rotation is stopped, magnetic head 12 is driven to be adjacent to a textured annular region 18 of the surface of disk 10. As this disk rotation slows and stops, the frictional and stiction effects occurring between the surface of annular region 18 and the adjacent contacting surface of magnetic head 12 are minimized by the textured nature of the surface of this region 18. Subsequently, when the rotation of disk 10 is restarted, these effects are again minimized, as the rate of rotation of disk 10 increases until the laminar flow of air near its surface lifts the adjacent surface of magnetic head 12 completely away from the disk surface. Thus, as the rotation of disk 10 is stopped and subsequently restarted, the wear of the surface of magnetic head 12 is minimized. Disk 10 is preferably a double-sided magnetic storage disk, with a second side, opposite the side shown in FIG. 1, having similar features.

Figure 2:
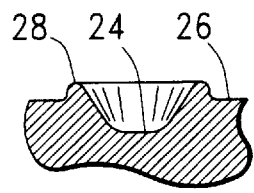
FIGS. 2 and 3 are transverse cross-sectional views of individual textured spots, which form examples of spots which may be made using the apparatus of the present invention.
Figure 3:
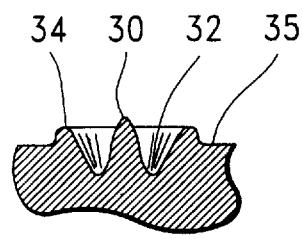

FIGS. 2 and 3 are transverse cross-sectional views of individual textured spots, which form examples of spots which may be made using the apparatus and method of the present invention.

FIG. 2 shows a portion of a disk surface roughened by the prior-art method taught by Ranjan, et al., in U.S. Pat. No. 5,062,021. With this method, a portion of the disk surface to be roughened is exposed to a pulse of laser light. The surface is heated rapidly, so that a part of the surface material is melted and then rapidly cooled, changing the surface topography to include a generally round central depression 24 below the nominal surface plane 26 and a generally round peripheral ridge 28 above this plane 26. The process described by Ranjan, et al. produces a ring of textured spots of this kind by repeatedly firing a laser as the disk being textured is rotated. The laser is then displaced radially through a pitch distance, and a second ring of textured spots, concentric with the first ring thereof, is produced. This process is repeated until texturing fills the annular region to be textured. The nature of each individual textured spot is determined primarily by the peak energy at which the laser is fired. together with the pulse width. The distance between textured spots on the ring is determined by the relationship between the rate at which the laser is fired and the rotational speed at which the disk is turned.

FIG. 3 is a transverse cross-sectional profile of a laser textured spot produced using the method of the previously-described co-pending U.S. patent application, Ser. No. 08/150,525. The heights of surface features, compared to their widths, are exaggerated. A central protrusion 30 rises above the depth of the ring depression 32, preferably to a height somewhat greater than the height of the surrounding peripheral ring 34. The heights of the protrusion 30 and ring 34 above the nominally level surface 35 before texturing are determined by various laser and disk-material parameters, such as laser fluence, pulse width, spot size, and disk surface composition.

Figure 4:
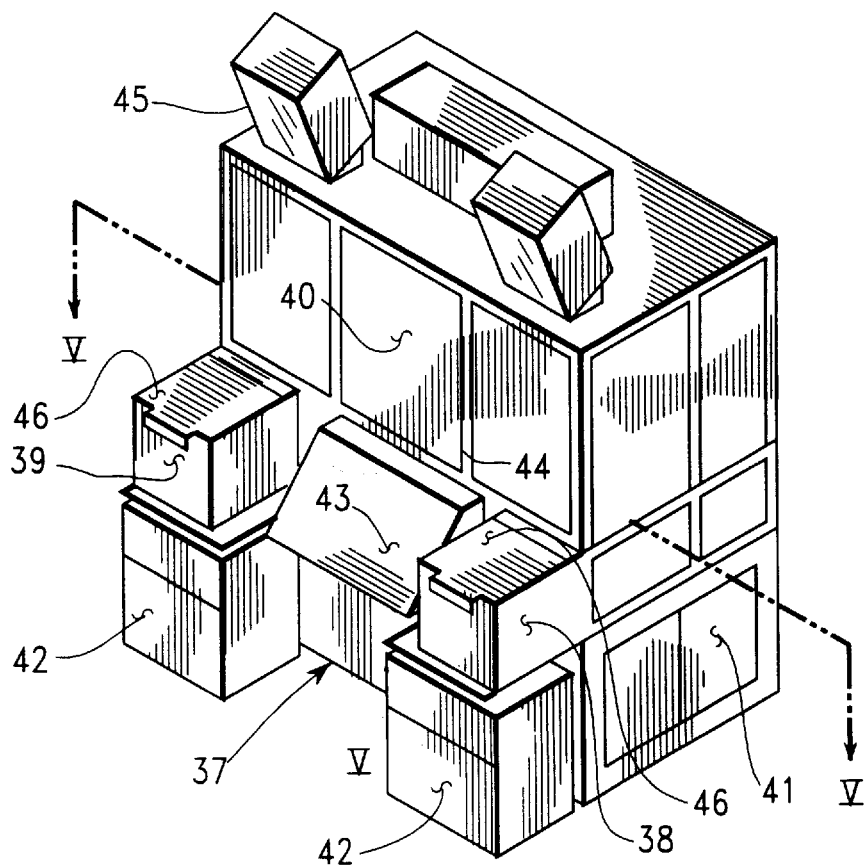
FIG. 4 is an isometric view of a laser disk texturing tool built in accordance with the present invention.

FIG. 4 is an isometric view of a laser-texturing tool 37, built in accordance with the present invention, which is used to apply laser-texturing to disks in a non-stop production mode as long as cassettes filled with disks are loaded and unloaded at a sufficient rate. These cassettes move through a right disk-handling station 38 and a left disk-handling station 39, with individual disks from these stations 38 and 39 being alternately textured by a single laser assembly in a laser-texturing station 40. A modular configuration allows the tool 37 to continue running, at a reduced rate of production, even if one of the disk-handling stations 38, 39 cannot be used.

The laser-texturing tool 37 is a self-contained system, with necessary electrical, electronic, and pneumatic components located in a base section 41 and in a pair of instrumentation cabinets 42. Various controls and output devices are placed on a slanted control panel 43. Since the infrared laser used in the texturing process produces invisible, potentially-harmful rays, a laser-texturing station 40 is housed in a light-tight cabinet within the tool 37, with a safety switch operated by the opening of each access door 44 turning off the laser. Furthermore, these doors 44 can be opened only when the tool is in a maintenance mode. The tool 37 is switched between automatic and maintenance modes by turning a mode switch (not shown) on control panel 43. Two television cameras (not shown), mounted within the laser-texturing station, allow the process to be viewed on a pair of monitors 45.

The upward-opening doors 46 of disk-handling stations 38 and 39, providing access for loading and unloading cassettes holding disks, are not interlocked, and may be opened or closed at any time, even during the operation of the texturing process. Within the tool 37, rays from the laser are blocked from the areas in which these cassettes are loaded and unloaded.

Figure 5:
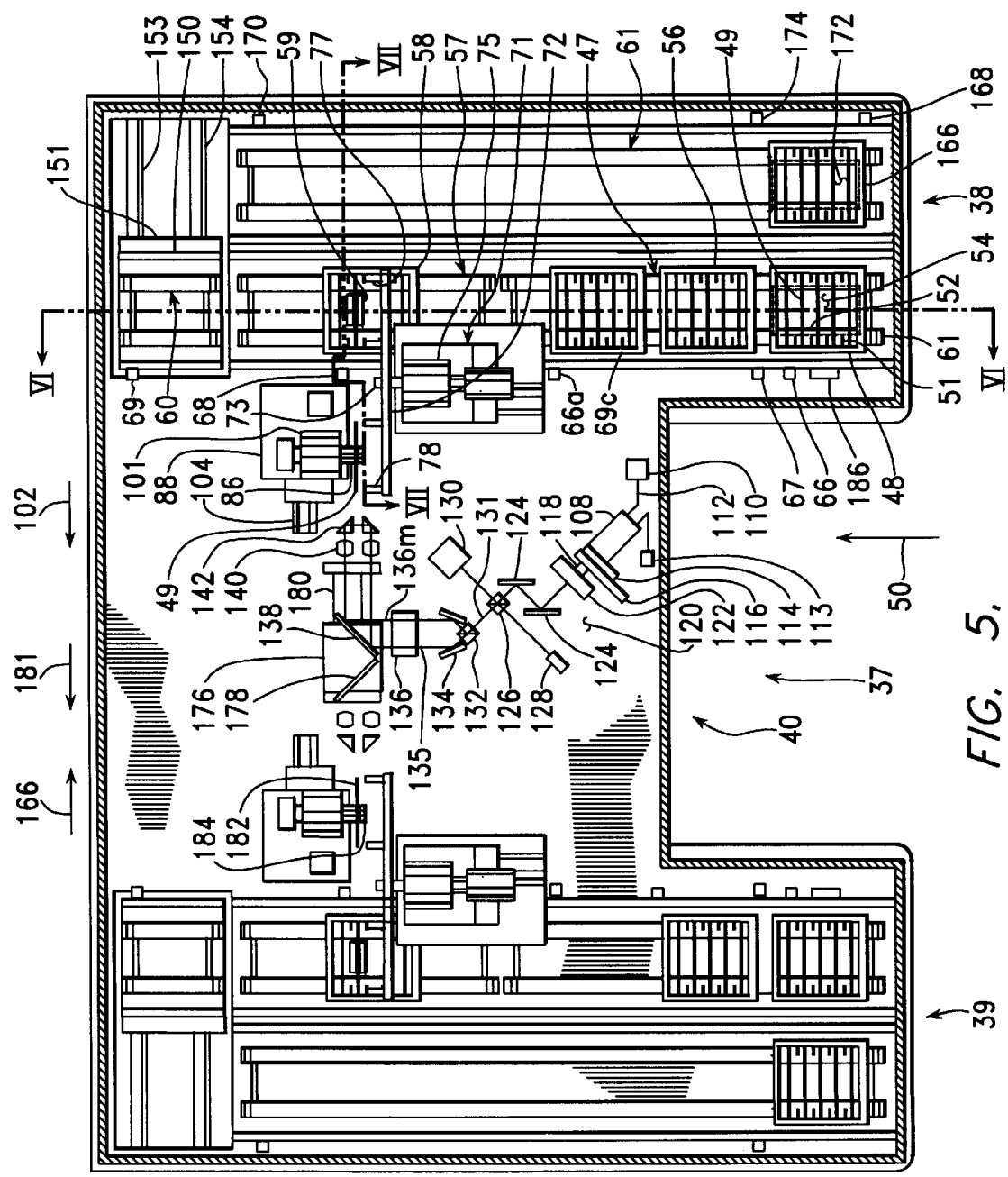
FIG. 5 is a cross-sectional plan view of the tool of FIG. 4, taken as indicated by section lines V—V in FIG. 4 to show disk-handling and laser-texturing stations thereof.

FIG. 5 is a horizontal cross-sectional view of laser-texturing tool 37, taken as indicated by section lines V—V in FIG. 4, to reveal particularly disk-handling stations 38, 39 and the laser-texturing station 40. Left disk-handling station 39 is a mirror image of right disk-handling station 38. Each disk-handling station 38, 39 has an input conveyor 47 carrying cassettes 48 loaded with disks 49 to be textured, rearward, in the direction of arrow 50. Each cassette 48 has a number of pockets 51 in which disks 49 are loaded in a vertical orientation, and a lower opening 52 allowing the removal of individual disks by lifting from below. While FIG. 5 shows cassettes having only five disks, for clarity, in reality a cassette for this system typically holds 25 disks.

Figure 6:
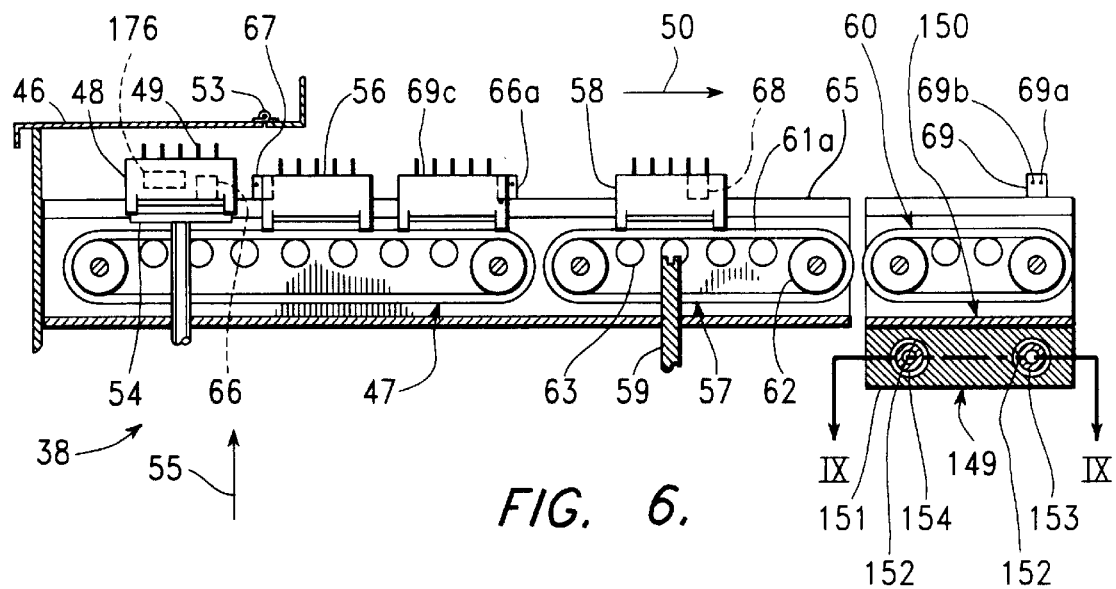
FIG. 6 is a cross-sectional side elevational view of the tool of FIG. 4, taken as indicated by section lines VI—VI in FIG. 5 to show mechanisms used to handle cassettes holding disks for texturing.

FIG. 6 is a cross-sectional side elevational view of the tool of FIG. 4, taken as indicated by cross-section lines VI—VI in FIG. 5, to show the conveyor systems moving cassettes filled with disks into and through the process. The tool operator loads a cassette 48 filled with disks 49 to be textured by opening the access door 46, which pivots upward along its rear hinge 53. The cassette 48 is normally loaded onto a raised platform 54, which, in this position holds the cassette 48 upward, in the direction of arrow 55, away from input conveyor 47, allowing this conveyor 47 to move another cassette 56 stored in a queue on the conveyor 47 without simultaneously moving the most-recently loaded cassette 48. FIG. 6 also shows a cassette indexing conveyor 57, which moves a cassette 58 in incremental motions above a disk lifter 59, so that the disk lifter 59 can remove individual disks 49 from the cassette 58 for placement into the laser-texturing process, and so that the disk lifter 59 can subsequently return textured disks to the cassette 58. FIG. 6 also shows a transfer table conveyor 60, which is used in the movement of cassettes filled with textured disks from indexing conveyor 57 to an output conveyor 61 (shown in FIG. 5).

Figure 7:
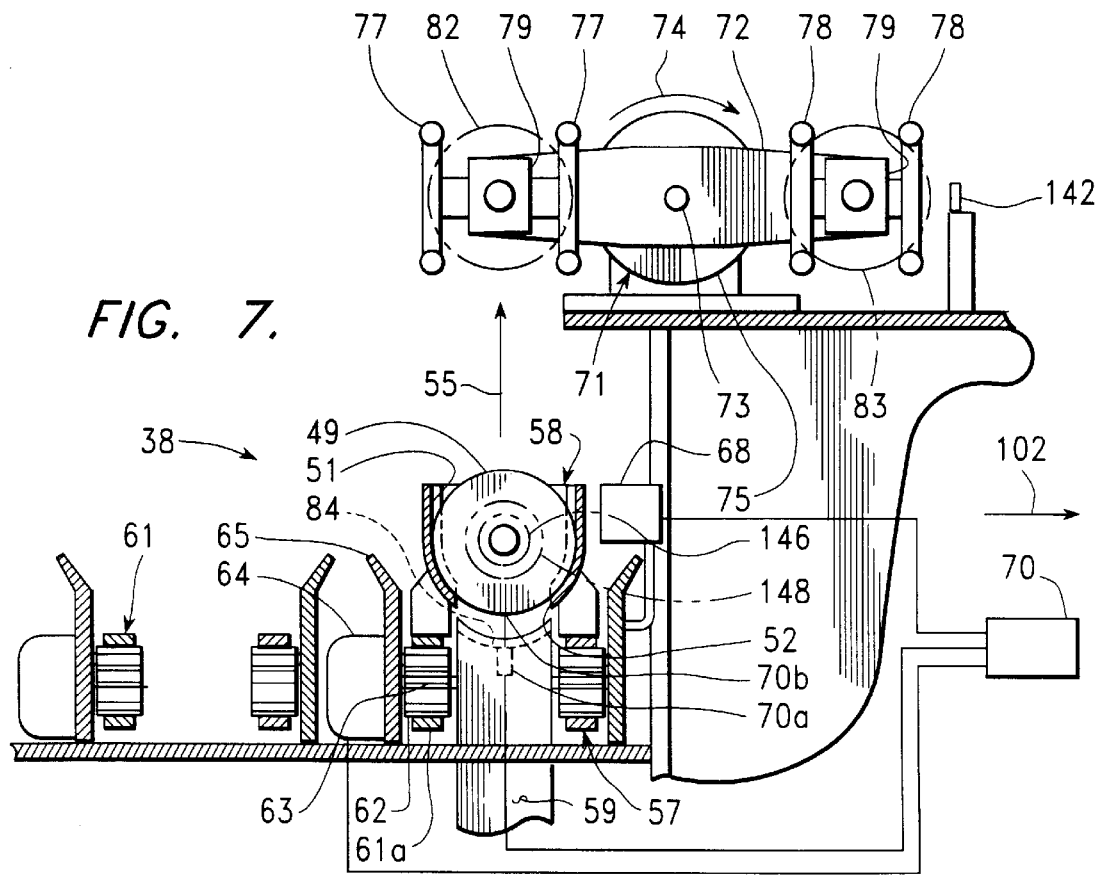
FIG. 7 is a cross-sectional rear elevational view of the tool of FIG. 4, taken as indicated by section lines VII—VII in FIG. 5 to show the mechanism used to transfer disks from cassettes within the disk-handling stations to the laser-texturing station and to return the disks to the cassettes.

FIG. 7 is a cross-sectional rear elevational view of the tool of FIG. 4, taken as indicated by section lines VII—VII in FIG. 5 to show the mechanism used to transfer disks from a cassette 58 within the disk-handling station 38 into the laser texturing process and to return textured disks to the cassettes. FIG. 7 also provides a transverse cross-sectional views of cassette indexing conveyor 57 and of output conveyor 61.

The movement of a cassette to the point at which individual disks are removed from the cassette to be carried into the texturing process will now be discussed, with particular reference being made to FIGS. 6 and 7.

Thus, referring to FIGS. 5, 6, and 7, each conveyor 47, 57, 60, 61 includes a belt 61a extending under each side of a cassette 48, 56, 58 loaded thereon. Each belt 61a extends between a pair of end rollers 62 and above a number of idler rollers 63. At one end of each conveyor 47, 57, 60, 61 the end rollers 62 are driven in either direction by a motor 64. This system for cassette transport also includes a pair of lateral guides 65, ensuring that each cassette stays in place atop the conveyors, and cassette detectors 66, 66a, 67, 68, 69, which determine when a cassette reaches an adjacent point along a conveyor system. Each cassette detector 66, 66a, 67, 68, 69 includes a light source 69a which is reflected off an adjacent surface of a cassette when such a surface is present, to be detected by a receiver 69b, which in turn provides an input to a computing system 70 controlling the operation of the motors 64 and other motors, solenoids, and valves within the laser-texturing tool 37 to effect operation as described herein.

When cassette 48 is placed on top of raised platform 54, its presence is detected by first input cassette detector 66. Since the input conveyor 47 and the system logic controlling its movement are configured to allow the queuing of cassettes, the subsequent movement of the cassette 48 is determined by whether other cassettes are already present on input conveyor 47 and indexing conveyor 57. If no cassette is already present on these conveyors 47, 57 (i.e., if cassettes 56, 58, and 69c are not present), platform 54 is lowered, so that the cassette 48 rests on top of input conveyor 47, and the conveyors 47, 57 are turned on to move cassette 48 rearward, in the direction of arrow 50. When indexing cassette detector 68 detects the presence of a cassette being moved in this way, input conveyor 47 and indexing conveyor 57 are stopped, leaving the cassette positioned so that the first of its pockets 51 in which diskettes 49 may be placed (i.e. the end pocket farthest in the direction indicated by arrow 50) is directly over disk lifter 59.

On the other hand, if a cassette 58 is present on indexing conveyor 57, and if no other cassette 56, 69c is present on input conveyor 47, when cassette 48 is placed on raised platform 54, this platform 54 is lowered, and conveyor 47 is turned on to move cassette 48 in the direction of arrow 50. This movement is stopped when the presence of the cassette 48 is detected by second input cassette detector 66a, leaving the cassette queued on the input conveyor 47, in the position in which cassette 69c is shown.

If a cassette 58 is present on indexing conveyor 57, and if a single cassette 69c is present on input conveyor 47, when cassette 48 is placed on raised platform 54, this platform 54 remains raised while input conveyor 47 is turned on to move cassette 69c opposite the direction of arrow 50 until this cassette 69c is sensed by third cassette sensor 67. Then, platform 54 is lowered, and input conveyor 47 is turned on to move both cassettes 48, 69c in the direction of arrow 50. This movement is stopped when cassette 69c is detected by second cassette sensor 66a, leaving both cassettes 48, 69c queued on input conveyor 47.

Finally, if all three cassettes 56, 69c, and 58 are present on conveyors 47, 57 when cassette 48 is placed on raised platform 54, the movement of cassettes does not directly ensue, leaving cassettes 56, 69c queued on input conveyor 47 and cassette 48 queued on raised platform 54.

When the texturing process has been completed on all of the disks 49 to be textured within the cassette 58 on indexing conveyor 57, this conveyor 57 and transfer table conveyor 60 are turned on to move the cassette 58 rearward, in the direction of arrow 50, completely onto the transfer table conveyor 60. This motion is stopped when the presence of cassette 58 is detected by transfer table cassette detector 69. If cassette 56 is present on input conveyor 47, as determined by second input cassette detector 67, when cassette 58 is transferred from indexing conveyor 57 in this way, this queued cassette 56 is moved by conveyors 47, 57 to the point at which its presence is detected by indexing cassette detector 68. If a second queued cassette 48 is present on raised platform 54 when a first queued cassette 56 is moved from input conveyor 47 to indexing conveyor 57, platform 54 is lowered, and the first queued cassette 48 is driven by input conveyor 47 until the presence of the cassette 48 is detected by second input cassette detector 67.

The movement of an individual disk from a cassette into the texturing process will now be discussed, with particular reference being made to FIGS. 5 and 7.

Thus, referring to FIGS. 5 and 7, to allow the movement of individual disks 49 through the laser-texturing process, indexing conveyor 57 moves cassette 58 in a number of rearward and forward motions, in and opposite the direction of arrow 50, sequentially aligning the individual disk pockets 51 of the cassette 58 with a disk lifter 59. Disk lifter 59 includes a proximity sensing mechanism 70a, for determining whether a disk 49 is present in each pocket 51. This sensing mechanism 70a consists of an internal light source aimed at an adjacent edge 70b of a disk present in a pocket 51 and an internal sensor detecting light reflected from such an edge 70b. The output of sensing mechanism 70a provides an additional input to computing system 70. Thus, cassette 58 is moved to the rear, in the direction of arrow 50, by indexing conveyor 57, until proximity sensing mechanism 70a indicates the presence of a disk 49 in a particular pocket 51, passing any empty pockets 51 within the cassette 58. When a disk is detected by proximity sensing mechanism 70a, the rearward movement of cassette 58 is stopped, and the disk lifter 59 moves upward, in the direction of arrow 55, carrying the disk 49 which is aligned the lifter 59 upward for transfer to a pick-and-place mechanism 71.

Pick-and-place mechanism 71 has an arm 72 rotatable about the axis of a drive shaft 73, in and opposite the direction of arrow 74, in 180-degree increments. This rotation is effected by the incremental operation of arm drive motor 75. At each end of arm 72, a pair of grippers 77, 78 is movable between an open position, in which grippers 77 are shown, and a closed position, in which grippers 78 are shown, by means of a pneumatic actuator 79. When a pair of grippers 77, 78 is in the closed position, a disk placed between the grippers is held by four points around its periphery. When the pair of grippers is opened, a disk held in this way is released. The pick and place mechanism 71 is also moved rearward, in the direction of arrow 50, into a position in which disks are picked up and released, and forward, in the direction opposite arrow 50, into a position in which arm 72 is rotated.

The upward movement of disk lifter 59 carries a disk 49, which is to be textured next, upward into the location indicated by phantom line 82. This motion, which brings the disk 49 into vertical alignment with the open grippers 77 of arm 72, occurs with pick and place mechanism 71 in its forward position (i.e., moved opposite the direction of arrow 50), allowing the upward passage of disk 49 past grippers 77. At this point, the disk rests within a groove 84 of the lifter 59. Next, pick and place mechanism 71 moves in the direction of arrow 50 to its rearward position, aligning the open grippers 77 with the edge of disk 49. Then, grippers 77 are closed, grasping the disk 49. Disk lifter 59 next descends to disengage from the periphery of disk 49. Next, pick and place mechanism 71 moves opposite the direction of arrow 50 to its forward position, and the arm 72 rotates 180 degrees in the direction of arrow 74, placing disk 49 in the position indicated by phantom line 83, in axial alignment with a spindle 86 of a spindle assembly 88. Then, pick-and-place mechanism 71 returns in the direction of arrow 50 to its rearward position, placing the disk 49 on the end of spindle 86.

Figure 8:
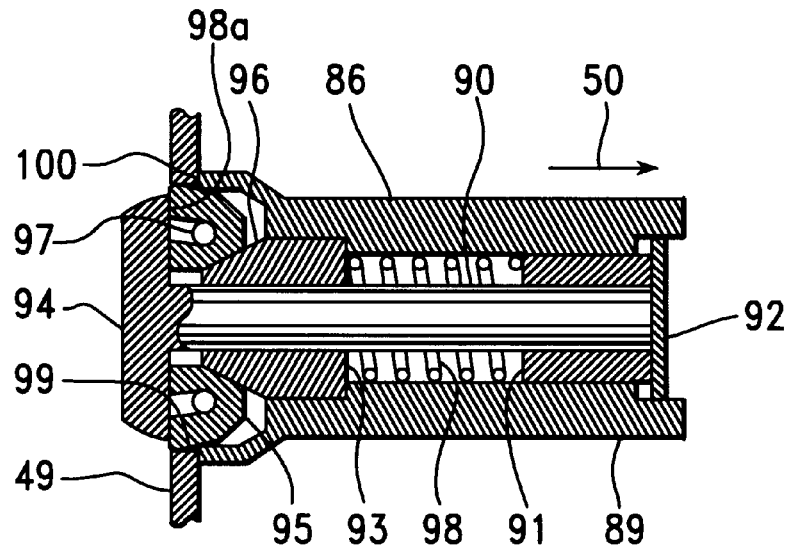
FIG. 8 is a longitudinal cross-sectional view of an end portion of a spindle, used to move disks through the texturing process in the tool of FIG. 4.

FIG. 8 is a longitudinal cross-sectional view of the end of spindle 86, which includes a rotationally-driven outer cylinder 89, in which an internal shaft 90 slides axially, in and opposite the direction of rearward-pointing arrow 50. A sliding bushing 91 and a piston 92, and a front end cap 94 move axially with internal shaft 90, while a front bushing 93 is held in place within the outer cylinder 89. A number of curved clamping blocks 95 extend around a truncoconical surface 96 of front bushing 93, being held inward, against this surface 96, by an elastomeric "O"-ring 97.

The internal shaft 90 is held in the rearward position shown (i.e. in the direction of arrow 50) by means of a compression spring 98 pressing an adjacent surface of the sliding bushing 91. With internal shaft 90 held rearward in this way, inner face 98a of end cap 94 pushes clamping blocks 95 rearward and outward, along truncoconical surface 96. This motion of the clamping blocks 95 grasps inner surface 99 of the disk 49, holding the disk in place against a front face 100 of outer cylinder 89. The disk 49 is released by applying a force to piston 92 in a forward direction, opposite the direction of arrow 50, to overcome the force exerted by compression spring 98, so that the internal shaft 90 is moved forward, opposite the direction of arrow 50. This force may be applied by a number of well known methods, such as through a pneumatically operated push-rod operating on piston 92. The resulting movement of end cap 94 allows the clamping blocks 95 forward and inward, releasing disk 49 from the spindle 86.

Referring to FIGS. 5, 7, and 8, pick-and-place mechanism 71 next moves to the rear, in the direction of arrow 50, placing the disk 49 to be textured, which is now at the position indicated by phantom line 83 in FIG. 7, on end cap 94 of spindle 86, with inner shaft 90 held in its forward position, so that clamping blocks 95 are retracted inward. Next, inner shaft 90 is moved to its rearward position, so that clamping blocks 95 are moved outward, clamping the disk 49 in place, and the grippers, which have been holding the disk on arm 72, open, releasing the disk 49. After disk 49 is placed on spindle 86, the pick-and-place mechanism 71 moves forward, opposite the direction of arrow 50, and the spindle drive motor 101 of spindle assembly 88 begins to rotate spindle 86 to bring the disk 49 up to a rotational velocity at which exposure to laser pulses will occur. The spindle assembly 88 also begins to move inward, in the direction of arrow 102, being driven by a spindle translation motor 104, carrying the disk 49 into the texturing process.

The laser-texturing station 40 will now be discussed, with specific references being made to FIG. 5.

Thus, referring to FIG. 5, within the laser-texturing station 40, a beam from an infrared pulsed laser 108 is used to produce the desired surface texturing on the disk 49. As described in the co-pending application referenced above, the laser 108 may be, for example, a Nd:YLF solid state laser, providing an output at a wavelength of 1.047 microns, or Nd:YVO$_4$ solid state laser, operated with a diode pumping signal, driven from a laser diode 110 through a fiber-optic cable 112, and pulsed by a Q-switch control 113. A beam from the laser 108 is directed through an electronic process shutter 114 and a mechanical safety shutter 116. When the laser-texturing station 40 is operating, a train of laser pulses is emitted from the laser 108, with the actual texturing process being started and stopped by opening and closing the electronic process shutter 114.

The process shutter 114 is actually a mechanical shutter which is opened and held open by the operation of an electromagnet (not shown). The termination of the flow of current through the electromagnet causes the process shutter to close. The operation of process shutter 114, and hence of the process of texturing an individual disk, is electronically controlled in response to the position of the disk to be textured, as determined through the use of a signal generated in response to the movement of, for example, the spindle assembly 88.

The safety shutter 116 remains open during the entire texturing process, unless an error condition, such as a jam of a disk or cassette, occurs. The detection of such an error condition causes the safety shutter 116 to close, by means of the software running the laser-texturing tool 37. The laser 108, electronic process shutter 114, and safety shutter 116 together form a light-tight assembly, from which even a portion of the laser beam cannot escape when either shutter 114, 116 is closed.

After passing through the shutters 114, 116, the laser beam enters a polarizing beamsplitter 118, which is oriented so that the portion of the laser beam, if any, having an unwanted p-polarization is directed downwards toward an underlying plate 120, leaving the portion of the laser beam having a vertical s-polarization to propagate through the remaining optical path. Next, the laser beam passes through a 3× beam expander/collimator 122, which permits the adjustment of the infrared laser spot size at a lens entrance.

Figure 5A:
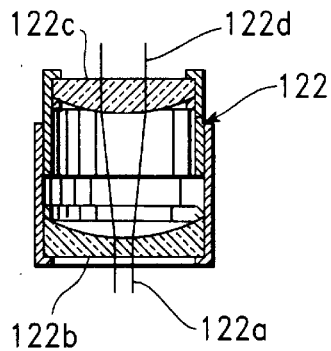
FIG. 5A is a longitudinal cross-sectional view of a beam expander in the tool of FIG. 4.

FIG. 5A is a longitudinal cross-sectional view of the beam expander/collimator 122. The input beam 122a passes through a diverging lens 122b, which causes the divergence, or expansion, of the beam, and through a converging lens 122c, which reduces the divergence of the beam leaving as output beam 122d. The distance between the beam expander lenses 122b, 122c is manually adjustable through the rotation of a threaded mechanical connection between the lens mounts. In the example of the laser-texturing tool 37, this adjustment is made to provide a slightly diverging output beam 122d.

Referring again to FIG. 5, from expander collimator 122, the laser beam is directed by a pair of dielectric-coated steering mirrors 124 to a dichroic beamsplitter 126. A visible laser beam, for example from a 2-mW laser diode 128, is also directed toward the beamsplitter 126, permitting alignment of the optical system by tracing the red laser dot. The infrared beam from laser 108 is made to be coincident with the red beam from laser diode 128 by manipulating the two steering mirrors 124. About three percent of the laser beam entering beamsplitter 126 from the infrared laser 108 is reflected from the beamsplitter 126 to a power detector 130, which provides in-situ monitoring of the laser power.

The infrared laser beam 131 leaving the dichroic beamsplitter 126 is directed to a non-polarizing beamsplitter cube 132, which splits the beam into two beams that are equal in intensity within five percent. These two beams are directed, by means of a pair of steering mirrors 134, toward opposite sides of the disk being carried through the texturing process by spindle assembly 88. After reflection off these steering mirrors 134, the laser beams travel as a pair of parallel beams 135, separated by a distance of 25 mm, to enter a power control optics block 136, in which the intensity of the two beams is balanced by controlling the voltage applied to liquid-crystal variable retarders. In this way the intensity of the parallel laser beams leaving the power control optics block 136 is made equal within one percent.

Figure 5B:
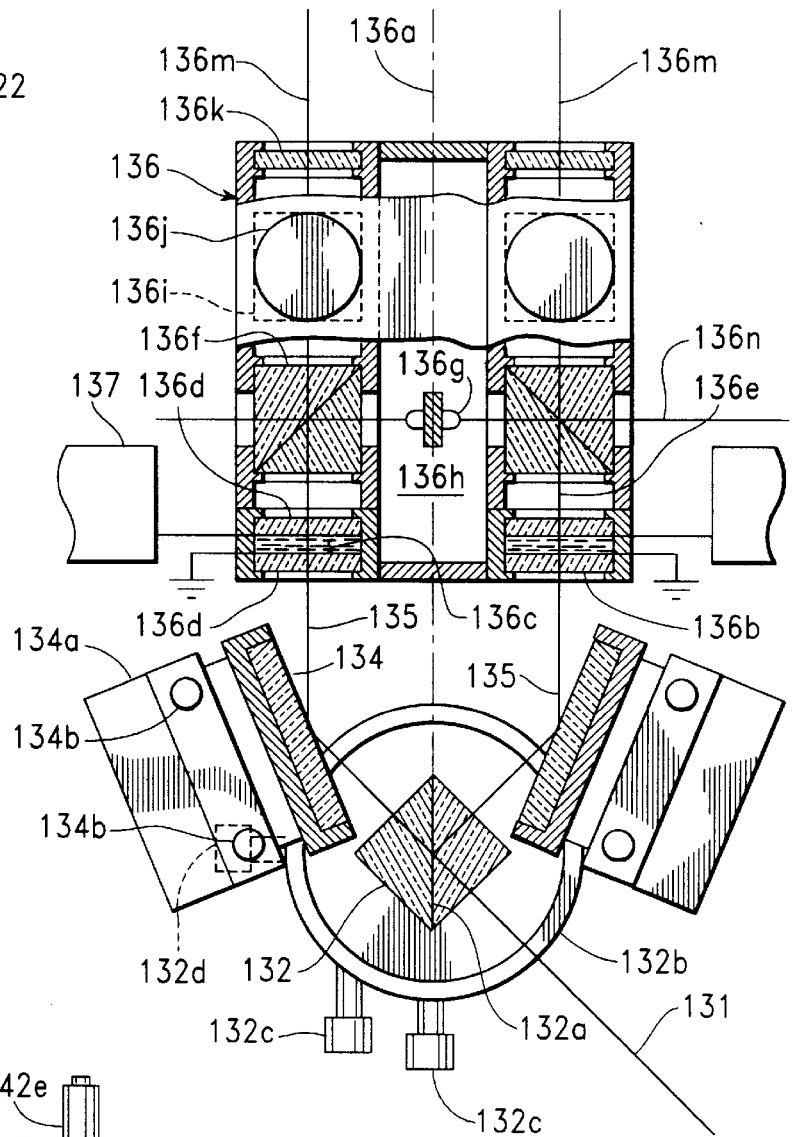
FIG. 5B is a partially sectional plan view of a beam splitter and power control optics block in the tool of FIG. 4.

FIG. 5B is a partially sectional plan view of the beamsplitter cube 132, together with steering mirrors 134 and the power control optics block 136. The two laser beams 135 forming inputs to the block 136 extend parallel to, and equally offset from, an axis 136a of the power control optics block 136, about which the various elements of this block 136 are symmetrically deployed. Symmetrical beams 135 result from the fact that the input beam 131 to the beamsplitter cube 132 is directed at a 45-degree angle with respect to the optics block axis 136a, with the reflective surface 132a within the beamsplitter cube being aligned along the optics block axis 136a. Each of the steering mirrors 134 is aligned to be struck by an associated beam from the beamsplitter cube 132 at an angle of incidence of 67.5 degrees.

Referring to FIG. 5B, adjustments for bringing the separate laser beams 135 into a parallel condition, and for otherwise aligning them, are provided by several manually turned knobs. Beamsplitter cube 132 is mounted on a rotary stage 132b, with a pair of knobs 132c tilting the cube 132 about orthogonal axes, and with a knob 132d providing for the rotation of the cube 132. For example, a rotary stage suitable for this application is supplied by the Newport Corporation of Irvine, Calif., under their part number PO32N. Each steering mirror 134 is mounted by an adjustable mirror mount 134a, which includes a pair of knobs 134b used to tilt the associated mirror 134 about mutually perpendicular axes. Mirror mounts suitable for this application are supplied, for example by the Ealing Electro Optics, Inc. Holliston, Mass., under their catalog number 37-4777.

Within the power control optics block 136, the power of the two beams 135 from beamsplitter cube 132 is balanced, so that these beams have power levels within one percent of one another. The beamsplitter cube 132 splits the single beam arriving from the laser into a pair of beams 135 having power levels within five percent of one another. While the beamsplitter cube 132 is a non-polarizing device, the laser beams 135 entering the power control optics block 136 are nominally, or predominately, s-polarized, having passed through polarizing beamsplitter 118 (shown in FIG. 5).

Within the power control optics block 136, each of these beams 135 first enters a liquid crystal variable retarder 136b. Each of these retarders 136b includes a cavity 136c formed between a pair of fused silica windows 136d spaced a few microns apart. The interior surface of each window 136d has a transparent conductive indium tin oxide coating. The cavity 136c is filled with birefringent nematic liquid crystal material with molecules that tip according to a voltage applied between the transparent conductive coatings of the windows 136c. The angle of polarization of the laser beam 135 entering each retarder 136b is changed according to the voltage applied across the cavity 136c by means of the coatings on windows 136d. Thus, the s-polarization of each beam 135 entering a retarder 136b is altered, in a continuously variable manner, toward a p-polarization of the beam 136e leaving the retarder 136b. A suitable liquid crystal variable retarder may be obtained, for example, from Meadowlark Optics, of Longmont, Colo., under their part number LVR-100-1047-V.

The voltage signal driving each liquid crystal variable retarder 136b is provided by the output of a function generator 137, which preferably produces a DC-balanced 2 kHz square wave having an amplitude which is adjustable to determine how the polarization of the beam passing through the retarder 136b is altered.

After exiting the retarder 136b, each beam 136e enters a polarizing beamsplitter 136f, which reflects s-polarized power inward to a beam dump 136g to be dissipated within a cavity 136h, while transmitting p-polarized energy to an non-polarizing beamsplitter 136i. Each non-polarizing beamsplitter 136i reflects about one percent of the energy incident upon it upward, providing the input to a power detector 136j. The remaining energy is transmitted through a quarter-wave plate 136k, which converts the p-polarized energy incident upon it into a circularly-polarized beam 136m exiting the power control optics block 136.

Referring to FIGS. 5 and 5B, independent means to measure and control the power levels of the single beam 135 derived from the output of laser 108 and of each of the beams 136m exiting the power control optics block 136 are provided. The power level of the single beam 131, which is measured by monitoring the output of power detector 130, is controlled, or attenuated, by varying an input signal to laser 108. The combination of a retarder 136b with a polarizing beamsplitter 136f provides a convenient way to control the power level of each beam 136m exiting the block 136, while the combination of a non-polarizing beamsplitter 136i with a power detector 136j provides a convenient means for measuring this power level. The output signals from power detectors 130, 136j are individually calibrated using measurements of beams 136m at the exit of the power control optics block, or farther along the optical path toward the point at which a disk 49 is textured. This type of calibration is generally needed because of a number of factors, such as differences in the percentage of incident power reflected within the beamsplitters 126, 136i aiming beams at these power detectors. The outputs of power detectors 130, 136j are preferably displayed externally on the laser texturing tool 37 (shown in FIG. 4).

A preferred method for manually setting-up or readjusting the various laser power levels includes the steps of monitoring the outputs of power detector 130 and making corresponding adjustments to a signal driving the laser 108. The two beams 136m are balanced by observing the outputs of both power detectors 136j with both retarders 136b set to transmit maximum levels of p-polarized power, and by reducing the level of p-polarized power transmitted by the retarder corresponding to the higher power level read by one of the power detectors 136j, until these two detectors indicate the same power level, with calibration factors being considered. As the level of p-polarized power is decreased in either of the beams, the level of power present in the corresponding output beam 136m is decreased, as the increased s-polarized power is rejected inward by the polarizing beam splitter 136f. In this way, the output levels of the two beams are balanced by attenuating the beam initially having the higher level.

In the example of FIG. 5, the parallel laser beams 136m from power control optics block 136 are reflected off a right shuttling mirror 138, being directed toward a disk carried through the texturing process from the right disk-handling station 38.

Figure 5C:
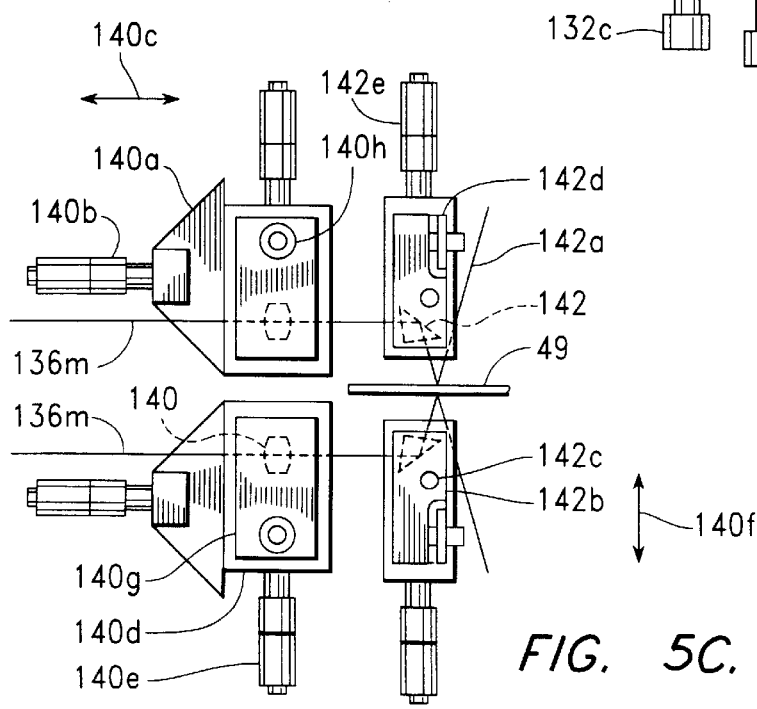
FIG. 5C is a plan view of beam directing apparatus adjacent a disk being textured within the tool of FIG. 4.

FIG. 5C is a plan view of the optical devices associated with the right disk-handling station 38. For example, each of these beams 136m passes through a focussing achromatic triplet lens 140, having a focal length of 25 mm, and is reflected toward the surface of the disk 49 being textured by a right-angle prism 142.

Referring to FIG. 5C, each lens 140 is mounted in a finely adjustable manner, permitting the adjustments needed to center the beam and to achieve optimum focus on each side of the disk 49. A first stage 140a, moved by a first micrometer-type screw mechanism 140b allows a lens focussing adjustment in the directions of arrow 140c. A second stage 140d, moved by a second screw mechanism 140e, allows lateral movement of the lens 140, in the directions indicated by arrow 140f. A third stage 140g, in which the lens 140 is mounted, allow vertical movement through the rotation of a third mechanism 140h.

Each prism 142 is slightly tilted, so that a laser beam reflected off the surface of the disk being textured is not transmitted back through the optical path, being instead generally reflected outward as a reflected beam 142a. Each prism 142 is mounted on a pivot arm 142b, pivotally mounted by a pin 142c to a stage 142d, which is in turn moved in the directions of arrow 140f by a micrometer-type screw mechanism 142e. The pivotal movement of each pivot arm 142b may be used to set the point on the disk 49 at which texturing begins. This type of adjustment is particularly useful for adjusting the process to produce textured surfaces on each side of the disk 49, starting and ending at the same diameters on the disk. When this is done, since the pivot pin 142c is offset from the reflective surface of the prism 142, the laser beam is expected to move along this reflective surface. If this movement displaces the laser beam too far from the center of this reflective surface, the position of prism 142 is corrected with screw mechanism 142e.

Referring again to FIGS. 5 and 5A, and continuing to refer to FIG. 5C, beam expander 122 is adjusted by changing the distance between 122b and lens 122c, during the initial adjustment of this apparatus, so that the laser beam 122a entering the beam expander 122 at a diameter of about 0.5 mm leaves the beam expander 122 as beam 122d with a diameter of about 1.3 mm, and so that the beam entering a focussing lens 140 has a diameter of about 1.5 mm. This lens 140 is focussed by movement in the direction of arrow 140c, using the screw mechanism 140b, so that the laser beam has a diameter of about 20 microns at the surface of a disk 49 being textured. An independent adjustment of this kind is made to focus a beam on each side of the disk 49.

Further adjustments of the beam expander 122 and of each focussing lens 140 may be made to effect changes in the process and in the textured spots generated on the disk 49. In general, adjusting the beam expander 122 to increase the diameter of the laser beam striking each focussing lens 140 makes it possible to focus a smaller beam diameter on the disk 49.

Referring to FIGS. 5, 5B, and 5C, despite the precaution of tilting each prism 142, to prevent the return of laser power reflected off the disk 49 within the optical path, some such power can be expected to return, due particularly to reflection from the non-uniform disk surface produced by the texturing process. However, the s-polarized light reflected back along the optical paths in this way is rejected by each polarizing beamsplitter 136f in the power control optics block 136, being directed outward as a beam 136n.

The movement of a disk through the laser-texturing process, and its subsequent return to the cassette from which it has been taken, will now be discussed, with particular reference being made to FIGS. 5 and 7.

Thus, referring to FIGS. 5 and 7, the disk 49 clamped to spindle 86 is first brought up to the rotational speed desired for the texturing process, as the motion of spindle assembly 88 drives the disk 49 inward, in the direction of arrow 102, to or past the point at which the inner diameter, indicated on FIG. 7 by phantom line 146, of the surfaces to be textured is adjacent to the point at which exposure will occur to laser beams reflected from prisms 142. The actual exposure, which is started by opening electronic process shutter 114, occurs as the disk 49 is rotated, for example, at a constant speed, by spindle drive motor 101 and as the disk 49 is moved in the outward direction, opposite arrow 102, for example, at a constant speed, by the spindle translation motor 104. When the disk 49 passes the point at which the outer diameter, indicated by phantom line 148, of the surfaces to be textured is adjacent to the point at which exposure occurs to laser beams reflected from prisms 142, electronic process shutter 114 is closed to terminate the exposure of the surfaces of disk 49 to the laser beam. Thus, an annular space on disk 49 is textured by placing a number of laser-generated texture patterns along a spiral, with the distance between the patterns adjacent along the spiral being determined by the rate at which laser 108 is pulsed, and by the rate of rotation of spindle 86, while the distance between radially adjacent segments of the spiral is determined by the rates of rotation and translation of spindle 86.

After completion of the texturing process, the rotation of spindle 86 is stopped, or allowed to decelerate, as the spindle assembly 88 continues moving outwardly, opposite arrow 102, to stop in the position adjacent to grippers 78, at the inward-extending end of the arm 72. At this point, the arm 72 is held forward, in the direction opposite arrow 50, so that the disk 49 can pass behind the grippers 78, which are held open. When this outward motion of spindle assembly 88 is complete, and when the rotational motion of spindle 86 is fully stopped, the arm 72 is moved rearward, and the grippers are closed to engage the disk 49. Next, the shaft 90 (shown in FIG. 8) is moved forward so that the clamping blocks 95 (also shown in FIG. 8) are retracted inward, releasing the disk 49 from spindle 86. Then, the arm 72 is moved forward, opposite the direction of arrow 50, and arm 72 is rotated 180 degrees about the axis of its drive shaft 73, opposite the direction of arrow 74, and the arm 72 is moved rearward, in the direction of arrow 50, moving the disk 49, which has most recently been textured, into position above the disk lifter 59. Next, lifter 59 moves upward, accepting the textured disk in its groove 84. The grippers on arm 72 holding the textured disk are opened, and the lifter 59 then descends, placing the textured disk 49 in a pocket 51 within the cassette 58.

The preceding discussion has described the movement of a single disk 49 from the cassette 58, in right disk-handling station 38, through the texturing process in laser-texturing station 40, and back into the cassette 58. In a preferred version of the present invention, two disks are simultaneously moved in opposite directions between the cassette 58 and the spindle 86, which carries each disk through the texturing process. This type of disk movement will now be described, with particular references being made to FIGS. 5 and 7.

Referring to FIGS. 5 and 7, except during the movement of the first and last disks 49 held within an individual cassette 58, each rotational movement of arm 72 in or opposite the direction of arrow 74 preferably carries one disk 49 from the disk lifter 59 to spindle 86 within grippers 77, while another disk 49 is simultaneously carried within grippers 78 from the spindle 86 to disk lifter 59. Sequential rotational movements of arm 72, which are similar in their movement of disks, occur in opposite rotational directions to avoid the winding of air hoses to actuators 79 and of wires to grippers 77, 78, which would occur if such movements were to continue in one direction.

Furthermore, a preferred version of the present invention returns each textured disk 49 to the cassette pocket 51 from which it has been taken, leaving the pockets 51 which have been determined to be empty by proximity sensor 70a in an empty condition. These conditions are achieved in a preferred version of the present invention, by allowing the simultaneous movement of two disks 49 by the pick and place mechanism 71, and by using the indexing conveyor 57 to return cassette 58 to the position in which disk lifter 59 accesses the pocket from which a disk 49 was taken before replacing the disk 49 in the cassette 58.

As a disk 49, which is hereinafter called the "A" disk 49 for convenience, is being taken through the texturing process by spindle 86, a "B" disk 49, which is the next disk 49 in the direction opposite arrow 50 past the cassette pocket 51 from which the "A" disk 49 has been taken, is found by movement of the cassette 58 in the direction of arrow 50 past the proximity sensor 70a. At this point, the movement of cassette 58 is stopped, and disk lifter 59 moves the "B" disk 49 upward, into the position indicated by phantom line 82. When the process of texturing the "A" disk 49 is finished, spindle 86 moves the "A" disk 49 into the position indicated by phantom line 83. When both the "A" and "B" disks 49 have been positioned in this way, pick-and-place mechanism 71 moves to the rear, in the direction of arrow 50, and both sets of grippers 77, 78 are closed to grasp the "A" and "B" disks 49. Within the spindle 86, shaft 90 (shown in FIG. 8) is moved to the front, moving clamping blocks 95 inward to disengage the spindle from the "A" disk 49, and the disk lifter 59 moves downward to disengage from the "B" disk 49. Next, the pick-and-place mechanism 71 moves forward, opposite the direction of arrow 50, and the arm rotational drive motor 75 drives arm 72 through a 180-degree angle in the direction of arrow 74. Now, the positions of the "A" and "B" disks 49 are reversed, with the "A" disk 49 being positioned for movement through the texturing process on spindle 86, and with the "B" disk 49 being positioned for return to cassette 58. Next, pick-and-place mechanism 71 moves to the rear, in the direction of arrow 50, placing the "B" disk 49 on spindle 86, and aligning the "A" disk 49 with disk lifter 59.

Thus, a first disk transfer point is established at the disk location shown by phantom line 82, and a second disk transfer point is established at the disk location shown by phantom line 83, both with pick-and-place mechanism 71 moved to the rear, in the direction of arrow 50. At the first disk transfer point, a disk 49 is transferred in either direction between pick-and-place mechanism 71 and disk lifter 59. At the second disk transfer point, a disk 49 is transferred in either direction between pick-and-place mechanism 71 and spindle 86.

In a preferred mode of operation, computing system 70 stores data indicating the pocket 51 within cassette 58 from which each disk is taken. This data is subsequently used to determine how the cassette 58 is moved opposite the direction of arrow 50 to return to the place from which the "A" disk 49 has been taken. When a cassette full of disks to be textured has been loaded into the disk-handling station 38, the cassette is moved one pocket position in the direction opposite that of arrow 50, from the position in which the pocket at which "B" disk 49 has been taken is directly above disk lifter 59, to the position in which the pocket at which "A" disk 49 has been taken is above disk lifter 59. If the cassette 58 was not full of disks 49 to be textured when it was loaded into disk-handling station 48, the cassette 58 may have to be moved farther than one pocket position opposite the direction of arrow 50. In any case, the cassette is moved so that the pocket from which the "A" disk 49 was taken is above disk lifter 59, using disk position data stored within computing system 70 and moving the cassette using indexing conveyor 57. This cassette movement can occur as the "A" disk is being moved, by pick-and-place mechanism 71, into place for reinsertion into the cassette 58, with the pick-and-place mechanism 71 moved forward, opposite the direction of arrow 50..

Next, disk lifter 59 moves upward, engaging "A" disk 49 within its groove 84, and the shaft 90 (shown in FIG. 8) is moved rearward, in the direction of arrow 50, so that clamping blocks 95 are extended outward to hold "B" disk 49 (also shown in FIG. 8) on the spindle 86. The grippers holding the "A" disk are opened, and disk lifter 59 moves downward, restoring "A" disk 49 into the pocket 51 from which it was taken, and spindle 86 moves inward, in the direction of arrow 102, while rotationally accelerating the disk to the rotational velocity at which texturing will occur. In this way, preparations are made to texture the next disk 49, which is, at this time, the "B" disk.

The first disk 49 taken from each individual cassette 58 is moved alone from disk lifter 59 to spindle 86, without the simultaneous movement of another disk 49 in the opposite direction, since there is no other disk available for such movement. Similarly, the last disk 49 taken from each individual cassette 58 is moved alone from spindle 86 to disk lifter 59, since there is no other disk available for movement in the opposite direction. The determination that the last disk 49 to be textured has been removed from the cassette 58 is made when the last pocket 51 into which disks 49 can be placed is moved past disk lifter 59 without the detection of another disk 49 by proximity sensor 70*a*. Only a single cassette 58 at a time is moved onto indexing conveyor 57, with all of the disks 49 to be textured within the cassette 58 being removed from the cassette 58, sent through the texturing process, and returned to the cassette 58 before any of the disks 49 in the next cassette 58 are so processed.

Figure 9:
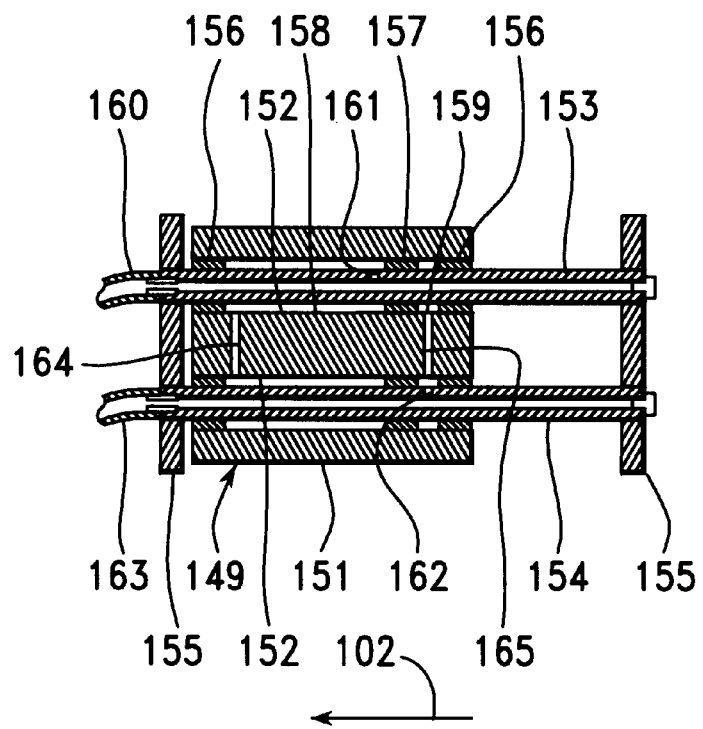
FIG. 9 is a cross-sectional plan view of a slider used to move cassettes filled with textured disks from one conveyer to another in the tool of FIG. 4.

FIG. 9 is a cross-sectional plan view of a slider mechanism 149 used to move a transfer table 150 on which cassettes are transferred from indexing conveyor 57 to output conveyor 61, taken as indicated by section lines IF—IF in FIG. 6..

Referring to FIGS. 6 and 9, the transfer table 150 is mounted atop slider mechanism 149, including a slider 151, having a pair of cylinders 152, through which a pair of hollow shafts 153, 154 extend. The shafts 153, 154 are in turn mounted to extend between end blocks 155. The slider 151 is slidably mounted on the shafts 153, 154 by means of bearing assemblies 156, which also include air-tight seals preventing the outward flow of air from the ends of cylinders 152. A central piston 157 is also attached to slide with the slider 151 along each shaft 153, 154. Each piston 157 includes seals separating the cylinder 152, within which it is attached, into an inward chamber 158 and an outward chamber 159, each of which is alternately filled with compressed air or exhausted to effect movement of the slider 151.

To move slider 151 inward, in the direction of arrow 102, compressed air is directed to the inward chambers 158, from hose 160, through a hole 161 in shaft 153. As this occurs, air is exhausted from outward chambers 159, through a hole 162 in shaft 154, and through hose 163. Both inward chambers 158 are connected by an inward transverse hole 164, and both outward chambers 159 are connected by an outward transverse hole 165. Thus, as compressed air is directed through hose 160 while hose 163 is exhausted to the atmosphere, the resulting expansion of inward chambers 158, together with a contraction of outward chambers 159, moves slider 151 inward, in the direction of arrow 102, aligning transfer table conveyor 60 with indexing conveyor 57.

Similarly, to move slider 151 outward, opposite the direction of arrow 102, compressed air is directed to the outward chambers 159, from hose 163, through hole 162 in shaft 154. As this occurs, air is exhausted from inward chambers 158, through hole 161 in shaft 153, and through hose 160. Thus, as compressed air is directed through hose 163 while hose 160 is exhausted to the atmosphere, the resulting expansion of outward chambers 159, together with a contraction of inward chambers 158, moves slider 151 outward, opposite the direction of arrow 102, aligning transfer table conveyor 60 with output conveyor 61.

The movement of a cassette 58 following the return thereto of all disks 49, having been textured, will now be discussed, with specific references being made to FIGS. 5, and 6.

Thus, referring to FIGS. 5 and 6, when it is determined that the last disk 49 to be textured in a cassette 58 has been processed and returned to the cassette 58, both intermediate conveyor 57 and transfer table conveyor 60 are turned on to move the cassette 58 rearward, in the direction of arrow 50, until the cassette 58 is completely on transfer table conveyor 60, as indicated by the output of transfer table cassette sensor 69. Upon the indication of sensor 69, movement of conveyors 57 and 60 is stopped, and a slider mechanism 149 is operated to drive the transfer table 150, which includes transfer table conveyor 60, in an outward direction, opposite the direction of arrow 102 along hollow shafts 153,154. After this motion is stopped with transfer table conveyor 60 in alignment with output conveyor 61, the conveyors 60, 61 are turned on to move cassette 58 to the front, opposite the direction of arrow 50. If other cassettes are not stored along the output conveyor 61, this movement is stopped when the cassette has been brought to the front of the conveyor 61, to the position in which cassette 166 is shown in FIG. 5, as indicated by a first output cassette sensor 168. At this point, the cassette 166, with processed disks 49, is ready for removal from the disk texturing tool 37.

Continuing to refer to FIG. 5, while this condition of readiness is preferably communicated to the system operator through a visible or audible indication, the removal of a cassette 166 with textured disks 49 is not generally required to permit continued operation of the disk texturing tool 37. Space is provided along output conveyor 61 for the storage of a number of cassettes 166 filled with textured disks 49. In a first version of this output system, all such cassettes 166 are stored along the surface of output conveyor 61. In a second version of this output system, the first cassette to reach the front of output conveyor 61 is stored on a raised platform The operation of the first version of this output system will now be described. In this version, if a cassette 166 is waiting for removal at the front of output conveyor 61 when the processing of disks 49 within another cassette 58 is completed, output conveyor 61 is turned on to move the cassette 166 rearward, in the direction of arrow 50. This movement is stopped when the presence of cassette 166 is detected by a second output cassette sensor 170. Then, with transfer table conveyor 60 in alignment with output conveyor 61, both transfer table conveyor 60 and output conveyor 61 are turned on to move cassettes 166 and 58 together to the front of conveyor 61, where this motion is stopped as first output cassette sensor 168 detects the presence of cassette 166. If necessary, this process is repeated several times, until output conveyor 61 is filled with a queue of cassettes holding disks 49 which have completed the texturing process. In each case, the rearward motion of output conveyor 61, in the direction of arrow 50, is stopped when the rearmost cassette in the queue reaches second output cassette sensor 170, and the subsequent forward motion of output conveyor 61 is stopped when the forwardmost cassette in the queue reaches first output cassette sensor 168.

The operation of the second version of this output system will now be described. This version requires an additional cassette lifting platform 172, which is similar to the platform 54 used with input conveyor 47, and a third output cassette sensor 174. With this version, the first cassette 166 to reach the end of output conveyor 61 is raised off the conveyor with lifting platform 172, to remain in a raised position until it is removed by the tool operator. With a cassette 166 in the raised position, output conveyor 61 is operated in both directions while not affecting the position of the cassette 166. Thus, when a second cassette, such as cassette 58, is loaded onto output conveyor 61, this conveyor 61 is turned on to drive the cassette forward, in the direction opposite arrow 50. This motion is stopped when the cassette is detected by third output cassette sensor 174. When the disks in a third cassette are completed, output conveyor 61 is turned on to drive the second cassette rearward. This motion is stopped when the second cassette is detected by second output cassette sensor 170. Then both transfer table conveyor 60 and output conveyor 61 are turned on to move the second and third cassettes forward, opposite the direction of arrow 50, until the second cassette is detected by third output cassette sensor 174.

Again, this process is repeated until output conveyor 61 is filled with a queue of cassettes holding disks 49 which have completed the texturing process. In each case, the rearward motion of output conveyor 61, in the direction of arrow 50, is stopped when the rearmost cassette in the queue reaches second output cassette sensor 170, and the subsequent forward motion of output conveyor 61 is stopped when the forwardmost cassette in the queue reaches third output cassette sensor 174. These movements occur as the first cassette 166 remains on raised platform 172.

At any point, if the cassette 166 on platform 172 is removed by the tool operator with one or more cassettes remaining on output conveyor 61, the conveyor 61 is turned on to drive the next cassette to the end of the conveyor 61, as detected by first output cassette sensor 168. The platform 172 is again raised to lift this cassette off output conveyor 61.

The methods described above for handling cassettes provide the particular advantage of not operating any conveyor system 47, 57, 60, 61 in sliding contact with a cassette. The generation of wear particles from relative motion between conveyor systems and cassettes is therefore avoided. Such wear particles could otherwise contaminate the manufacturing process of which this texturing is a part. Furthermore, the useful life of conveyor belts and cassettes is increased, with cassettes and conveyer belts being likely to last as long as various other moving parts of the disk texturing tool 37.

The configuration of output conveyor 61 extending alongside input conveyor 47 provides the advantage of bringing output cassettes, holding disks which have gone through the texturing process, back to a place adjacent to the place where input cassettes are loaded. This facilitates servicing the tool 37 by personnel who must both load and unload cassettes. Furthermore, additional space for queuing cassettes along the conveyors is gained without having to increase the length of the tool 37 along the conveyors.

The preceding discussion of the movement of cassettes and disks has focussed on such movement within right disk-handling station 38 of the laser-texturing tool 37. Thus, the various movements of disks and cassettes described above are used alone if the left disk-handling station 39 is not available. For example, the left disk-handling station may not be available due to a technical problem, or simply because cassettes have not been loaded into it. Furthermore, an embodiment of the present invention has only a single disk-handling tool, which is operated as described in detail above. Nevertheless, in the preferred method of operation of the preferred embodiment of the present invention, which will now be described with particular reference being made to FIG. 5, both right disk-handling station 38 and left disk-handling station 39 are used in an alternating fashion to present disks to be textured within laser-texturing station 40.

Thus, referring to FIG. 5, in a preferred version of the present invention, the operation of left disk-handling station 39 is generally the same as operation of right disk-handling station 38, with various elements of the apparatus within the left disk-handling station 39 being mirror image configurations of corresponding elements within the right disk-handling station 38. The preceding discussion of operations within right disk-handling station 38 is equally applicable to operations within left disk-handling station 39, with rearward motions, in the direction of arrow 50, remaining the same, and with inward motions, in the direction of arrow 102 continuing to be directed toward the center of the laser texturing tool 37, in the direction of arrow 166, within left disk-handling station 39. Similarly, forward motions, opposite the direction of arrow 50 are in the same direction in both left and right disk-handling stations 38, 39, while outward motions in left disk-handling station 39 are opposite the direction of arrow 166.

Within disk-texturing station 40, right shuttling mirror 138 is mounted on a mirror slide 176, together with a left shuttling mirror 178. Mirror slide 176 is operated pneumatically, sliding on a pair of shafts 180, using a mechanism operating generally as described above in reference to FIG. 9. With mirror slide 176 in its leftward position, moved in the direction of arrow 181 as shown in FIG. 5, the laser beams passing through power control optics block 136, having been derived from the output of infrared laser 108, are directed to disk 49, clamped on spindle 86 of right disk-handling station 39, as previously described. Mirror slide 176 is alternately moved into a rightward position, so that the laser beams passing through power control optics block 136 reflect off left shuttling mirror 178, being directed to a disk 182 held by spindle 184 of left disk-handling station 39. In this way, the laser beams employed in the disk texturing process are directed to either disks within the right disk-handling station 38 or left disk-handling station 39 simply by moving mirror slider 176.

While the above discussion describes the use of a sliding mechanism having two mirrors to direct the laser beams between the two disk-handling stations 38, 39, a single pivoting mirror could alternately be used for this purpose.

The operation of right disk-handling station 38, which has been described in some detail above, may be considered to consist basically of disk-movement cycles alternating with texturing cycles, wherein each disk movement cycle consists of the movement of one or two disks by pick-and-place mechanism 71, and wherein each texturing cycle consists of the movement of a single disk on the spindle 86. Whenever sufficient disks are available for texturing to allow the disk texturing tool 37 to operate at full capacity, each disk-movement cycle of right disk-handling station 38 occurs simultaneously with a texturing cycle of left disk-handling station 39, and each disk-movement cycle of left disk-handling station 39 occurs simultaneously with a texturing cycle of right disk-handling station 38. In this way, the use of the texturing process available through operation of infrared laser 108 is maximized, along with the overall process speed of the laser texturing tool 37. However, when disks to be textured are not available from one of the disk-handling stations 38, 39, the other disk handling station can continue to run at its full speed.

Referring to FIGS. 5–7, a preferred version of the present invention includes a bar code scanner 186 for reading bar code labels (not shown) placed on a side of a cassette 48, which is put on platform 54. To use this feature, the computing unit 70 executes a program relating bar codes read by scanner 186. Data gathered by reading bar code labels may be stored and used by an inventory control system to keep track of work in process.

The present invention provides advantages of optimized productivity and flexibility. In a preferred mode of operation, both disk-handling stations 38, 39 are simultaneously used as described above, maximizing the rate of production for the laser texturing tool 37. The use of laser 108 is optimized, with various disk-handling processes in each disk-handling station 38, 39 occurring while a disk 49, 172 in the other disk-handling station is being exposed to the laser. The use of separate disk-handling stations also provides flexibility; if either of the disk-handling stations 38, 39 is disabled, production can continue at a reduced rate using the other disk-handling station. A single disk-handling station 38, 39 can also be used, if desired, when untextured disks sufficient for the use of both stations are not available for the process.

The apparatus and process for controlling various aspects of the laser texturing tool 37 (shown in FIG. 4) will now be discussed as particular references are made to FIGS. 10–12. As previously discussed in reference to FIGS. 4 and 5, the laser texturing tool 37 includes a right disk-handling station 38 and a left disk-handling station 39, with individual disks from these stations 38 and 39 being alternately textured by a single laser assembly in a laser texturing station 40.

Figure 10:
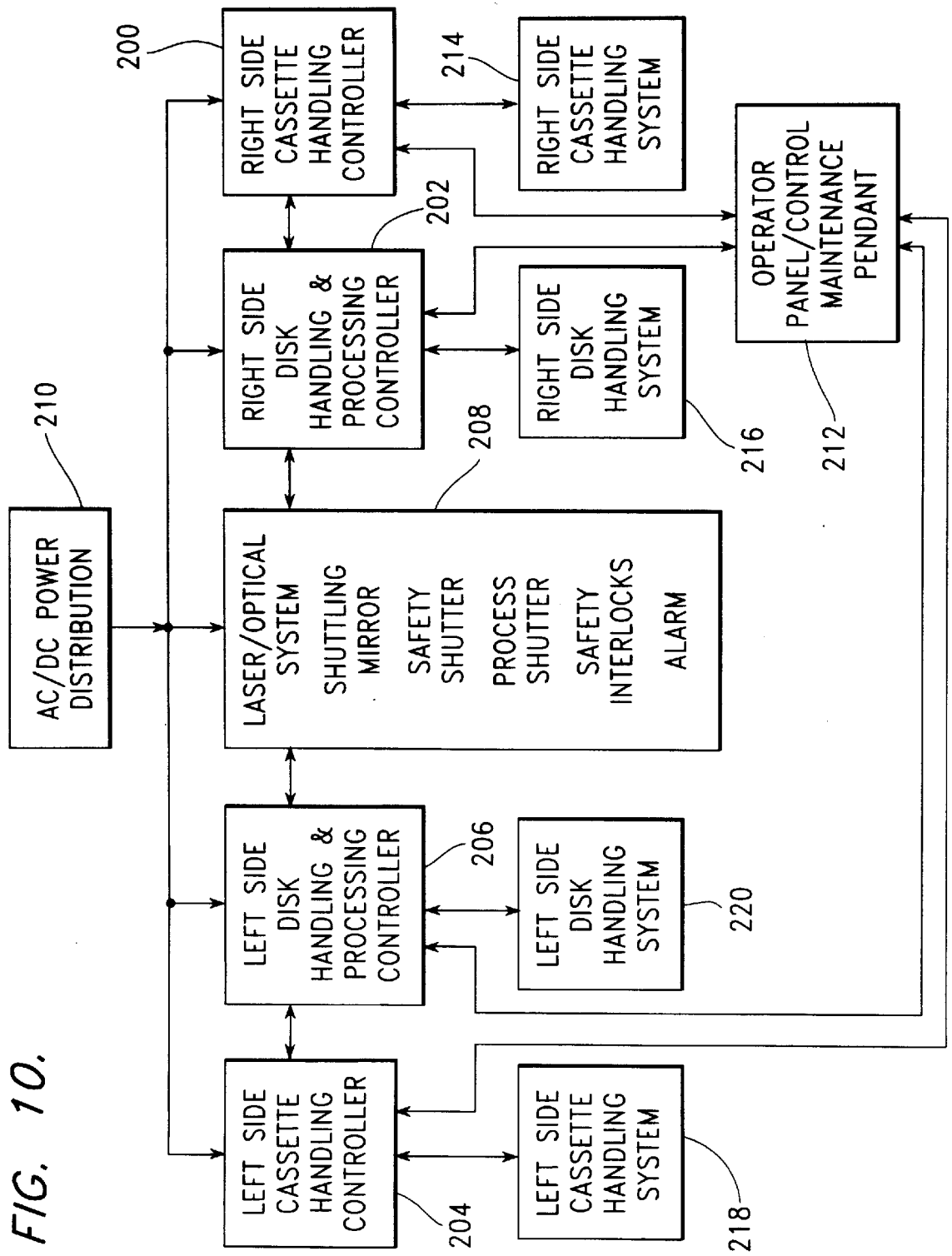
FIG. 10 is a block diagram of the electronic apparatus used to control the processes within the tool of FIG. 4.

FIG. 10 is a block diagram of the electronic architecture used to control the processes within the tool 37. Referring to FIGS. 4, 5, and 10, control functions are carried out by a right side cassette handling controller 200, by a right side disk handling and processing controller 202, by a left side cassette handling controller 204, and by a left side disk handling and processing controller 206. The right side cassette handling controller 200 and the left side cassette handling controller 204 communicate with the right side disk handling and processing controller 202 and the left side disk handling and processing controller 206, respectively. The right side disk handling and processing controller 202 and the left side disk handling and processing controller 206 share a number of hardware resources 208. All of these controllers and devices share a common source of electrical power (AC and DC) in the form of power distribution 210.

Operator controls 212 communicate with all four controllers 200, 202, 204, 206. These controls 212 include the control panel 43 and a hand-held pendant (not shown), which is used by a maintenance person to troubleshoot the devices of tool 37 and to identify and diagnose problems in a maintenance mode. Specifically, with the pendant, a maintenance person can test the various sensors, switches and interlocks of the tool 37, performing adjustments and other repair actions while observing the on/off or closed/open status of these components on the display of the pendant. The maintenance person can also control various devices, such as relays, solenoids, and motors within the tool 37, using the pendant keypad while observing the status of these components and the devices they move. With this capability, adjustments and replacements of components can be done rapidly.

Furthermore, using the pendant allows a single maintenance person to perform these actions, since the pendant, being hand held, can be used where the observations need to be made. Otherwise two people are needed, with one person operating the controls from, for example, control panel 43, while the other person performs the necessary observations and adjustments.

The right-side cassette handling system 214, which has been discussed above in reference to FIGS. 5, 6, and 9, is controlled by right-side cassette handling controller 200. In particular, the right-side cassette handling system includes conveyors 47, 57, 60, 61 and associated devices for detecting the presence of cassettes at various points. The right side disk handling system 216 includes disk handling devices described above in reference to FIGS. 5, 7, and 8. In particular, the right-side disk handling system includes the disk lifter 59, the pick and place mechanism 71, and the spindle assembly 88. The left-side cassette handling system 218, which is controlled by left side cassette handling controller 204, includes left-side devices which are similar to those of right side cassette handling system 214. The left side disk handling system 220, which is controlled by left side disk handling and processing controller 206, includes left-side devices which are similar to those of right side disk handling system 216.

Hardware resources 208, the control of which is shared by disk handling and processing controllers 202, 206, include various optical devices which have been described above in reference to FIGS. 5 and 5B. In particular, these devices include the actuators moving shuttling mirror slide 176, electronic process shutter 114, and safety shutter 116, a number of safety interlocks, including interlock switches detecting whether doors are closed and locked.

FIG. 11 is a block diagram of the software architecture running in the processors associated with the left side operation of the laser texturing tool 37 (shown in FIG. 4). Referring to FIGS. 10 and 11, a left side cassette handling software module 230 runs in left side cassette handling controller 204, while both a left side disk handling and processing software module 232 and laser optics system software module 234 run in left-side disk handling and processing controller 206. The software modules 230, 232 exchange data regarding cassette and disk handling. The software modules 232, 234 exchange data regarding the laser texturing process. An operator panel control and maintenance module 236 communicates with module 232, determining whether the left side of the tool is in a production mode, in a paused mode, or in a maintenance mode. These software modules 232, 234, 236 also run similarly in right-side controllers 200, 202.

In the production mode, each side of the tool operates normally, with disks being moved through the texturing process and with safety doors closed and locked. In this mode, cassettes filled with disks can be added to, or removed from, the laser texturing tool without interrupting the texturing process. A side of the system is placed in the pause mode if the operator presses a "PAUSE" button on the control panel 43 (shown in FIG. 4), or if the system detects an error condition preventing continued production. The system is placed in the maintenance mode by a maintenance person, who turns a switch in the control panel 43 with a key.

Figure 12A:
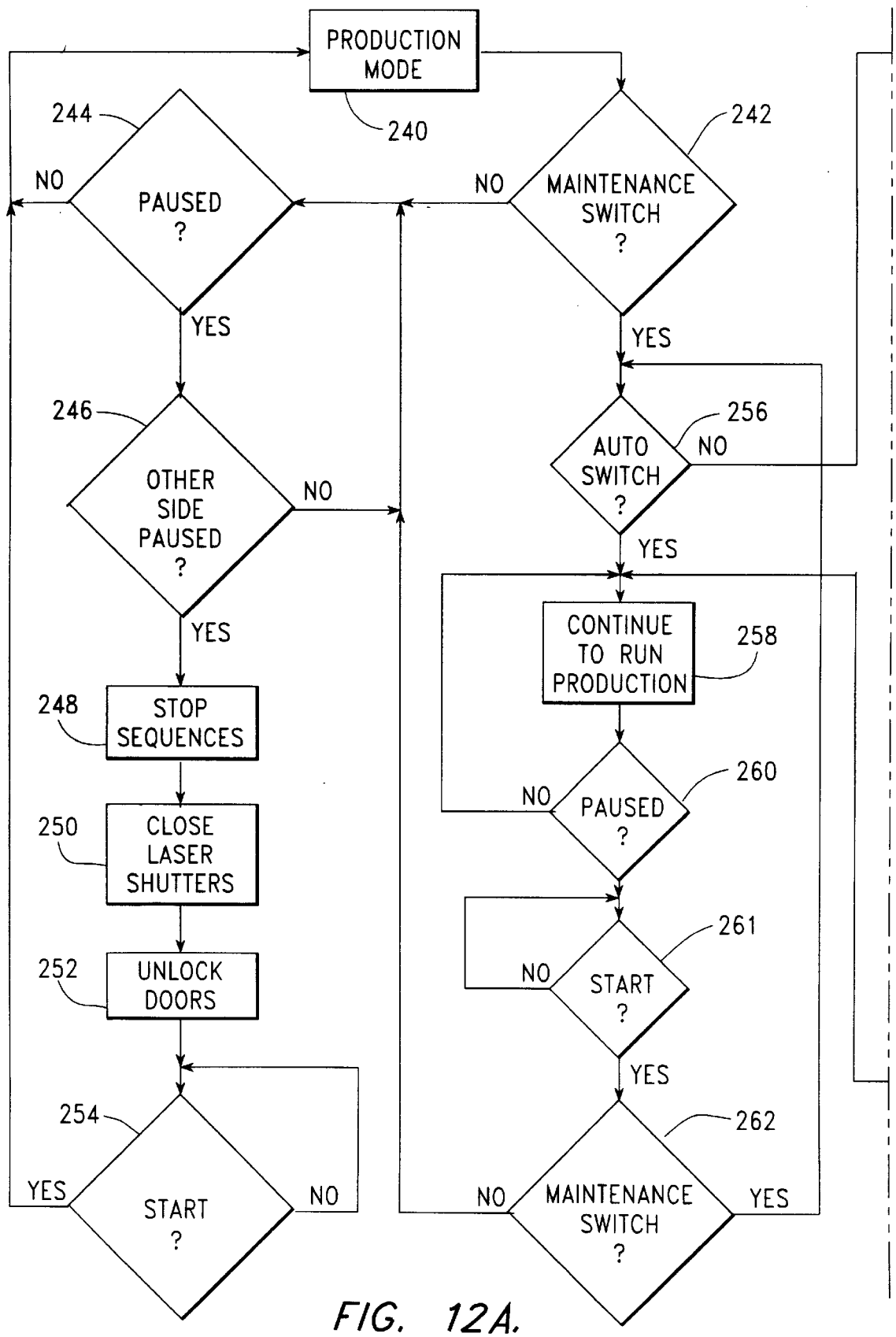
FIG. 12 is a flow diagram of a disk handling and processing software module in the diagram of FIG. 11.
Figure 12B:
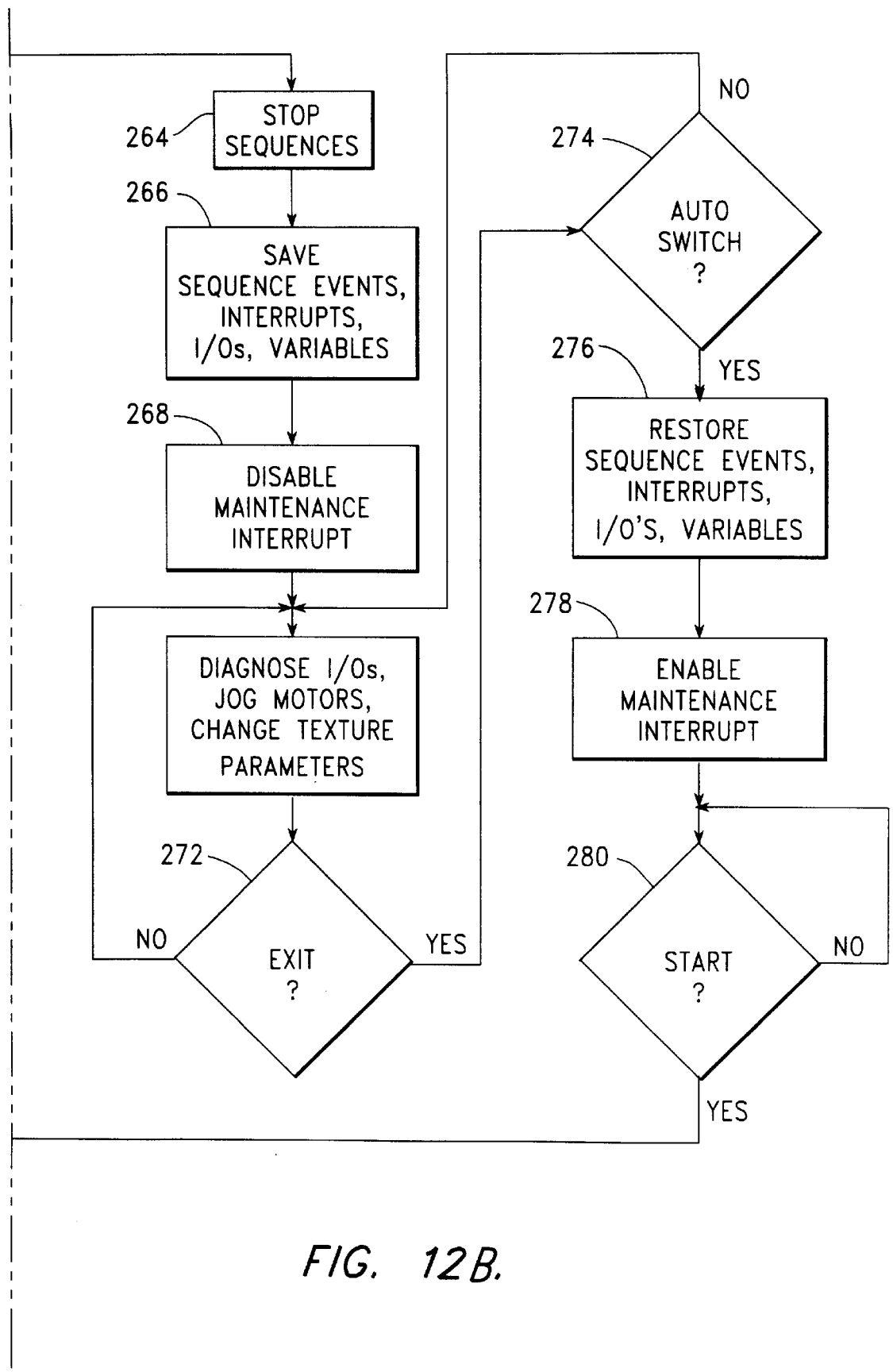

FIG. 12 is a flow diagram of the disk handling and processing software module 232. The process of this software begins with the system side (right or left) with which the software is associated running in the production mode in block 240. If the maintenance key is turned to start the maintenance mode, of if the "PAUSE" button is depressed, an interrupt is issued, causing the system to proceed to block 242, where the system determines if the maintenance mode is not on, the system next checks in block 244 to determine if this side of the system has been paused. If it has not been paused, production is continued in block 240. If the system has been paused, a determination is made in block 246 of whether the other side has been paused. If the other side has not been paused it is allowed to remain in production, as the system returns to block 244 to again check on whether this side has been paused. As long as these conditions persist, with this side only paused, the system simply runs in a loop waiting for a change in either pause status. If the pause condition of this side is ended, the system returns to block 240 from block 244, resuming production. If the other side is paused, the system goes to a sequence preparing the system for operator access. This sequence includes performing stop sequences in block 248 closing the laser shutters in block 250, and unlocking the doors in block 252. At this time, the operator can perform various error recovery procedures. When he is finished, he depresses a "START" button to begin production. Thus, after the safety doors are unlocked in block 252, the system periodically determines, in block 254, whether the "START" button has been depressed. If it has been depressed, the system returns to block 240, starting production.

The depression of an "AUTO" switch allows the tool to continue production while its functions are observed in maintenance mode. Thus, if a determination is made in block 242 that the system is in maintenance mode, a new determination is made, in block 256 of whether the "AUTO" switch has been depressed. If this switch has been depressed, placing the system in auto mode, production is continued in block 258. The system continues to check, in block 260, to determine whether the pause mode has been elicited. If it has not, the system returns to block 258 to continue running production. If the system is in pause mode, the system waits in a loop with block 261 until the start switch is depressed. Then, a determination is made in block 262 of whether the system is still in maintenance mode. If it is not in maintenance mode, the system goes to block 244, to proceed as previously explained for a determination that the system is not in maintenance mode in block 242. On the other hand, if a determination is made in block 262 that the system is in maintenance mode, it proceeds to block 256, proceeding as described above following a determination in block 242 that the system is in maintenance mode.

If it is determined in blocks 242 and 256, respectively, that the maintenance mode switch has not been turned on and that the auto mode is also not on, a test sequence is begun with the execution of stop sequences in block 264. Then, in block 266, data from various sequentially occurring events is stored to be restored later. In block 270, diagnostic routines are run, motors are jogged, and texturing parameters are changed. Then, in block 272, a determination is made concerning whether an exit of the testing programs has been reached. If the exit has not been reached, the system returns to block 270 to repeat the testing process. If the exit has been reached, a determination is made in block 274 of whether the system has been placed in auto mode. If it is not in auto mode, the system returns to block 270 to repeat the testing process. If the system is in auto mode, it proceeds to block 276 to restore the data which has been saved in block 266. Then the maintenance interrupt is restored in block 278. After this occurs, a determination is periodically made in block 280 of whether the "START" switch has been depressed. If it has, the system returns to block 258, continuing to run production as described above for this block 258.

Thus, the laser texturing tool 37 (shown in FIG. 4), including the electronic hardware shown in FIG. 10, is broken into left and right systems, which share a common AC/DC power distribution and a common laser/optics unit. Each system has its own operator interface and its own controllers, which operate independently, without a need for a master central controller. Each system is composed of two sub-systems, a cassette handling sub-system and a disk handling sub-system. Each sub-system has its own controller, and all sub-system controller operate independently, without a need for a master central controller. Each disk handling sub-system controller controls and monitors the common components of the laser/optics system, without a need for a master central controller.

The software architecture is also designed to provide independent control software, without a need for a master supervisory control software, as two sub-systems having work in process (disks and cassettes) are controlled. These tool subsystems share a common sub-system including the laser and optics for texture processing.

The present invention provides advantages of simplicity over conventional means for controlling subsystems. A first conventional method employs a single central processor with central control software to control the various subsystems, while a second conventional method employs a master supervisory controller, with master supervisory control software, to control the various sub-systems running other software modules on a single platform. On the other hand, the present invention uses four control processors on which software sub-systems run, which are divided into two identical pairs of processors with software sub-systems, since the left and right sides of the tool are identical. Each control software sub-system operates independently, talking to other software sub-systems with simple I/O "handshakes" in which data is exchanged. This method of communication between the software sub-systems allows faster troubleshooting, as each sub-system can be debugged independently using I/O simulation techniques, without relying on the use of another sub-system. Since the tool is symmetrical, the control software of each side is simple and identical to that of the other side.

While the invention has been described in its preferred form or embodiment with some degree of particularity, it is understood that this description has been given only by way of example and that numerous changes in the details of construction, fabrication and use, including the combination and arrangement of parts, may be made without departing from the spirit and scope of the invention. For example, the pneumatic sliders described in reference to FIG. 9 may be replaced by a number of well-known methods for achieving and controlling movement, such as electric motors driving leadscrews.

What is claimed is:

1. Control apparatus for controlling operation of laser texturing apparatus, wherein said laser texturing apparatus includes a central laser station and left and right disk handling stations feeding disks through said central laser station from left and right sides thereof, and wherein said control apparatus comprises:

a left disk handling and processing controller controlling movement of said disks from said left side into and out of said laser station; and a right disk handling and processing controller controlling movement of said disks from said right side into and out of said laser station, with said left disk handling and processing controller and said right disk handling and processing controller alternately controlling processes in said laser station, wherein said left and right disk handling and processing controllers can operate alone or together.

2. The control apparatus of claim 1, comprising additionally:

a left cassette handling controller for controlling movement of cassettes carrying disks through said left disk handling station, with said left cassette handling controller being controlled by said left disk handling and processing controller; and a right cassette handling controller for controlling movement of cassettes carrying disks through said right disk handling station, with said right cassette handling controller being controlled by said right disk handling and processing controller.

3. The control apparatus of claim 2:

wherein said left cassette handling controller operates a left input conveyer moving cassettes with disks to be textured from a left input staging area to a left indexing area, a left indexing conveyer moving said cassettes through said left indexing area, wherein disks are removed from said cassettes and replaced therein, and a left output conveyer moving cassettes with textured disks into a left output staging area; and wherein said right cassette handling controller operates a right input conveyer moving cassettes with disks to be textured from a right input staging area to a right indexing area, a right indexing conveyer moving said cassettes through said right indexing area, wherein disks are removed from said cassettes and replaced therein, and a right output conveyer moving cassettes with textured disks into a right output staging area.

4. The control apparatus of claim 3:

wherein said left disk handling and processing controller operates a left disk lifter removing disks from a cassette moving through said left indexing area and replacing textured disks therein, a left pick and place mechanism removing disks from said left disk lifter and replacing textured disks therein, and a left spindle mechanism moving disks into and out of said laser station and rotating said disks during texturing within said laser station, with movement of said cassette through said left indexing area and of said left disk lifter occurring in response to a left sensing mechanism sensing presence of disks within said cassette moving therethrough, with said left pick and place mechanism moving disks in both directions between said left disk lifter and said left spindle mechanism; and wherein said right disk handling and processing controller operates a right disk lifter removing disks from a cassette moving through said right indexing area and replacing textured disks therein, a right pick and place mechanism removing disks from said right disk lifter and replacing textured disks therein, and a right spindle mechanism moving disks into and out of said laser station and rotating said disks during texturing within said laser station, with movement of said cassette through said right indexing area and of said right disk lifter occurring in response to a right sensing mechanism sensing presence of disks within said cassette moving therethrough, with said right pick and place mechanism moving disks in both directions between said right disk lifter and said right spindle mechanism.

5. The control apparatus of claim 4, wherein said processes controlled in said laser station include:

moving a shuttling mirror so that a laser beam within said laser station is directed toward a disk in said left spindle mechanism or toward a disk in said right spindle mechanism;

operating a process shutter which is opened to begin texturing a disk and closed to end texturing said disk; and monitoring an interlock switch detecting whether a door is opened or closed.

6. The control apparatus of claim 5:

wherein said control apparatus operates in a normal production mode with a left disk texturing cycle occurring simultaneously with a right disk transfer cycle, with a right disk texturing cycles occurring simultaneously with a left disk transfer cycle, and with said left and right disk texturing cycles occurring in an alternating manner;

wherein, during said left disk texturing cycle, said shuttling mirror is positioned to direct said laser beam toward said disk in said left spindle mechanism, and said left disk handling and processing controller operates said left spindle mechanism moving said disk therein through said laser station, and operates said process shutter to expose a preferred annular portion of said disk therein to said laser beam;

wherein, during said right disk texturing cycle, said shuttling mirror positioned to direct said laser beam toward said disk in said right spindle mechanism, and said right disk handling and processing controller operates said right spindle mechanism moving said disk therein through said laser station, and operates said process shutter to expose a preferred annular portion of said disk therein to said laser beam;

wherein, during said left disk transfer cycle, said left disk handling and processing controller operates said left pick and place mechanism to move a textured disk from said left spindle to said left disk lifter and simultaneously to move a disk to be textured from disk lifter to said left spindle mechanism; and wherein, during said right disk transfer cycle, said right disk handling and processing controller operates said right pick and place mechanism to move a textured disk from said right spindle to said right disk lifter and simultaneously to move a disk to be textured from disk lifter to said right spindle mechanism.

7. The control apparatus of claim 6:

wherein said control apparatus is also capable of operation in first and second reduced-rate production modes;

wherein, with said control apparatus in said first reduced-rate production mode, said left disk texturing cycle occurs in an alternating fashion with said left disk transfer cycle; and wherein, with said control apparatus in said second reduced-rate production mode, said right disk texturing cycles occurs in an alternating fashion with said right disk transfer cycle.

8. The control apparatus of claim 7:

wherein said control apparatus changes from said normal production mode to said first reduced-rate production mode in response to detection of depression of a first pause button and in response to detection of an error condition in said right disk handling station; and wherein said control apparatus changes from said normal production mode to said second reduced-rate production mode in response to detection of depression of a second pause button and in response to detection of an error condition in said left disk handling station.

9. In apparatus for laser texturing disks, wherein said apparatus comprises a laser station and first and second disk handling stations feeding disks through said laser station, with production within said apparatus including texturing individual said disks within said laser station, a method for controlling operation of said laser station and of said first disk handling station, wherein said method comprises the steps of:

(a) determining when a first pause switch, associated with pausing said first disk handling station, is actuated during production with disks from said first disk handling station;

(b) when said first pause switch is actuated, as determined in step (a), placing said first disk handling station in a paused mode and determining if said second disk handling station has been paused;

(c) if said second disk handling station has been paused, as determined in step (b), preparing said apparatus for operator access by disabling a laser beam within said laser station;

(d) if said second disk handling station has not been paused, as determined in step (b) allowing production to continue within said laser station with disks from said second disk handling station; and (e) returning to production with disks from said first disk handling station when a start switch is actuated.

10. The method of claim 9:

wherein, in step (b) said laser beam is disabled by closing a shutter; and wherein step (b) additionally includes steps of initiating stop sequences and of opening a door for access.

11. The method of claim 9, additionally comprising the steps of:

(f) determining when a maintenance switch is actuated during production with disks from said first disk handling station;

(g) if said maintenance switch is actuated, determining if an auto switch is actuated;

(h) if said auto switch is actuated, as determined in step (g), continuing to run production with disks from said first disk handling station;

(i) determining, during production in step (h), if said first pause switch is actuated;

(k) when said first pause switch is actuated, as determined in step (i), stopping production with disks from said first disk handling station;

(l) returning to production from step (k) with disks from said first disk handling station, when said start switch is actuated;

(m) determining if said maintenance switch is actuated;

(n) if said maintenance switch is not actuated, as determined in step (m), returning to step (a); and (o) if said maintenance switch is actuated, as determined in step (m), returning to step (g).

12. The method of claim 11, additionally comprising the steps of:

(p) if said maintenance switch is actuated, but said auto switch is not actuated, as determined in step (g), storing operational parameters and beginning a series of test sequences, including variation of operational parameters and storage of test results.

(q) at an end of said test sequences, determining if said auto switch is actuated;

(r) returning to step (p) to repeat said series of test sequences if said auto switch is not actuated, as determined in step (q);

(s) if said auto switch is actuated, as determined in step (q), restoring operation at operational parameters stored in step (p) and determining if said start switch has been actuated;

(t) if said start switch has been actuated, as determined in step (p), beginning production with disks from said first disk handling station.

13. Control apparatus for controlling operation of laser texturing apparatus:

wherein said laser texturing apparatus includes a laser station in which disks are textured by exposure to a laser beam, and first and second disk handling stations for feeding disks through said laser station;

wherein said control apparatus comprises input means, including first and second pause switches, first and second start switches, a first disk handling and processing controller controlling movement of said disks from said first disk handling station into and away from said laser station; and a second disk handling and processing controller controlling movement of said disks from said second disk handling station into and away from said laser station; and wherein said control apparatus is operable in a full-rate production mode causing disks from both said first and second disk handling stations to be textured within said laser station, in a first reduced-rate production mode causing only disks from said second disk handling station to be textured within said laser station, and in a second reduced-rate production mode causing only disks from said first disk handling station to be textured within said laser station;

wherein actuation of said first pause switch with said control apparatus in said full-rate production mode causes said control apparatus to begin operation in said first reduced-rate production mode, with said first disk handling station in a paused mode;

wherein actuation of said second pause switch with said control apparatus in said full-rate production mode causes said control apparatus to begin operation in said second reduced-rate production mode, with said second disk handling station in a paused mode;

wherein actuation of said first pause switch with said second disk handling station in a paused mode, and actuation of said second pause switch with said first disk handling station in a paused mode stops production while preparing said laser station for maintenance access;

wherein actuation of said first start switch with said first disk handling station in said paused mode causes production to begin with disks from said first disk handling station; and wherein actuation of said second start switch with said second disk handling station in said paused mode causes production to begin with disks from said second disk handling station.

14. The control apparatus of claim 13:

wherein said input means additionally includes a maintenance switch and an auto switch, and wherein actuation, in said full-rate production mode, of said maintenance switch and said auto switch causes said system to continue running in said full-rate production mode.

* * * * *